(12) United States Patent
Bennett et al.

(10) Patent No.: US 9,292,085 B2
(45) Date of Patent: Mar. 22, 2016

(54) CONFIGURING AN INTERACTION ZONE WITHIN AN AUGMENTED REALITY ENVIRONMENT

(75) Inventors: Darren Bennett, Seattle, WA (US); Brian J. Mount, Seattle, WA (US); Michael J. Scavezze, Bellevue, WA (US); Daniel J. McCulloch, Kirkland, WA (US); Anthony J. Ambrus, Seattle, WA (US); Jonathan T. Steed, Redmond, WA (US); Arthur C. Tomlin, Bellevue, WA (US); Kevin A. Geisner, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 365 days.

(21) Appl. No.: 13/539,043

(22) Filed: Jun. 29, 2012

(65) Prior Publication Data
US 2014/0002444 A1  Jan. 2, 2014

(51) Int. Cl.
*G09G 5/377* (2006.01)
*G06F 3/01* (2006.01)
*G06T 19/00* (2011.01)

(52) U.S. Cl.
CPC .............. *G06F 3/012* (2013.01); *G06F 3/011* (2013.01); *G06F 3/013* (2013.01); *G06T 19/006* (2013.01)

(58) Field of Classification Search
CPC .................................................. G06T 19/006
USPC ........................................................ 345/633
See application file for complete search history.

(56) References Cited

U.S. PATENT DOCUMENTS

| | | | |
|---|---|---|---|
| 6,335,731 B1 | 1/2002 | Yamamoto | |
| 6,445,364 B2 | 9/2002 | Zwern | |
| 6,529,183 B1* | 3/2003 | MacLean et al. | 345/156 |
| 7,002,551 B2 | 2/2006 | Azuma et al. | |
| 7,479,967 B2 | 1/2009 | Bachelder et al. | |
| 7,725,203 B2 | 5/2010 | Richards et al. | |
| 2003/0032484 A1 | 2/2003 | Ohshima et al. | |

(Continued)

OTHER PUBLICATIONS

Near-Eye Augmented Reality Tower Controller Displays: Human Performance Issues John W. Ruffner, Ph.D., Roger R. Labbe, DCS Corporation, Alexandria, V A Steve Hoyt, NVIS, Inc., Reston, VA, Interservice/Industry Training, Simulation, and Education Conference (IIITSEC) 2006.*

(Continued)

*Primary Examiner* — Javid A Amini
(74) *Attorney, Agent, or Firm* — Dan Choi; Judy Yee; Micky Minhas

(57) ABSTRACT

Technology is described for automatically determining placement of one or more interaction zones in an augmented reality environment in which one or more virtual features are added to a real environment. An interaction zone includes at least one virtual feature and is associated with a space within the augmented reality environment with boundaries of the space determined based on the one or more real environment features. A plurality of activation criteria may be available for an interaction zone and at least one may be selected based on at least one real environment feature. The technology also describes controlling activation of an interaction zone within the augmented reality environment. In some examples, at least some behavior of a virtual object is controlled by emergent behavior criteria which defines an action independently from a type of object in the real world environment.

18 Claims, 13 Drawing Sheets

(56) References Cited

U.S. PATENT DOCUMENTS

| | | |
|---|---|---|
| 2005/0130725 A1 | 6/2005 | Creamer et al. |
| 2005/0231532 A1 | 10/2005 | Suzuki et al. |
| 2005/0239545 A1 | 10/2005 | Rowe |
| 2006/0105838 A1 | 5/2006 | Mullen |
| 2006/0128460 A1 | 6/2006 | Muir et al. |
| 2007/0060390 A1 | 3/2007 | Wells |
| 2008/0094417 A1 | 4/2008 | Cohen |
| 2009/0024703 A1 | 1/2009 | Tamura |
| 2009/0215533 A1 | 8/2009 | Zalewski et al. |
| 2009/0221368 A1 | 9/2009 | Yen |
| 2009/0221374 A1 | 9/2009 | Yen |
| 2009/0244097 A1 | 10/2009 | Estevez |
| 2010/0045701 A1 | 2/2010 | Scott et al. |
| 2010/0185529 A1* | 7/2010 | Chesnut et al. ............ 705/27 |
| 2010/0215191 A1 | 8/2010 | Yoshizawa et al. |
| 2010/0238161 A1* | 9/2010 | Varga et al. ............ 345/419 |
| 2010/0287485 A1* | 11/2010 | Bertolami et al. ........... 715/764 |
| 2010/0321540 A1 | 12/2010 | Woo et al. |
| 2011/0025689 A1 | 2/2011 | Perez et al. |
| 2011/0102460 A1 | 5/2011 | Parker |
| 2011/0221656 A1* | 9/2011 | Haddick et al. ............ 345/8 |
| 2011/0249122 A1* | 10/2011 | Tricoukes et al. ........... 348/158 |
| 2012/0001938 A1* | 1/2012 | Sandberg ............ 345/633 |
| 2012/0113141 A1 | 5/2012 | Zimmerman et al. |
| 2012/0242865 A1 | 9/2012 | Vartanian et al. |
| 2013/0265502 A1* | 10/2013 | Huebner ............ 348/789 |
| 2013/0290876 A1* | 10/2013 | Anderson et al. ............ 715/761 |
| 2013/0342570 A1* | 12/2013 | Kinnebrew et al. ........... 345/633 |

OTHER PUBLICATIONS

"Agents that talk and hit back: animated agents in augmented reality" Barakonyi, I. ; Psik, T. ; Schmalstieg, D. Mixed and Augmented Reality, 2004. ISMAR 2004. Third IEEE and ACM International Symposium on DOI: 10.1109/ISMAR.2004.11 Publication Year: 2004.*

U.S. Appl. No. 13/689,378, filed Nov. 29, 2012.

Response to Office Action filed Jul. 17, 2014 in U.S. Appl. No. 13/689,378, 13 pages.

"AR Second Life", [retrieved on Sep. 7, 2011], Retrieved from the Internet: <URL:http://arsecondlife.gvu.gatech.edu/proj_playspace.html>, 1 page.

Caudell, et al., "Augmented Reality: An Application of Heads-Up Display Technology to Manual Manufacturing Processes", In Proceedings of the Twenty-Fifth Hawaii International Conference on System Sciences, vol. 2, Jan. 7-10, 1992, pp. 659-669, 11 pages.

Doswell, et al., "Extending the 'Serious Game' Boundary: Virtual Instructors in Mobile Mixed Reality Learning Games", In Digital Games Research Association International Conference, Sep. 27, 2007, pp. 524-529, 6 pages.

U.S. Appl. No. 13/288,350, filed Nov. 3, 2011.

Office Action dated Nov. 26, 2013 in U.S. Appl. No. 13/689,378, 62 pages.

Response to Office Action filed Feb. 20, 2014 in U.S. Appl. No. 13/689,378, 14 pages.

Interview Summary dated Feb. 26, 2014 in U.S. Appl. No. 13/689,378, 3 pages.

Final Office Action dated Apr. 17, 2014 in U.S. Appl. No. 13/689,378, 43 pages.

Liarokapis et al., A Pervasive Augmented Reality Serious Game, Proc. of the 1st IEEE International Conference in Games and Virtual Worlds for Serious Applications, IEEE Computer Society, Coventry, UK, Mar. 23-24, 148-155, (2009). ISBN: 978-0-7695-3588-3, 8 pages.

Kato et al., Virtual Object Manipulation on a Table-Top AR Environment, Proc. Int'l Symp. Augmented Reality 2000 (ISAR 00), IEEE CS Press, Los Alamitos, Calif., 2000, pp. 111-119., 9 pages.

Office Action dated Nov. 6, 2014 in U.S. Appl. No. 13/689,378, filed Nov. 29, 2012, 44 pages.

Response to Office Action filed Feb. 6, 2015 in U.S. Appl. No. 13/689,378, filed Nov. 29, 2012, 13 pages.

Final Office Action dated May 21, 2015 in U.S. Appl. No. 13/689,378, 47 pages.

Response to Office Action filed Aug. 17, 2015 in U.S. Appl. No. 13/689,378, 12 pages.

Office Action dated Jan. 13, 2016 in U.S. Appl. No. 13/689,378, 54 pages.

* cited by examiner

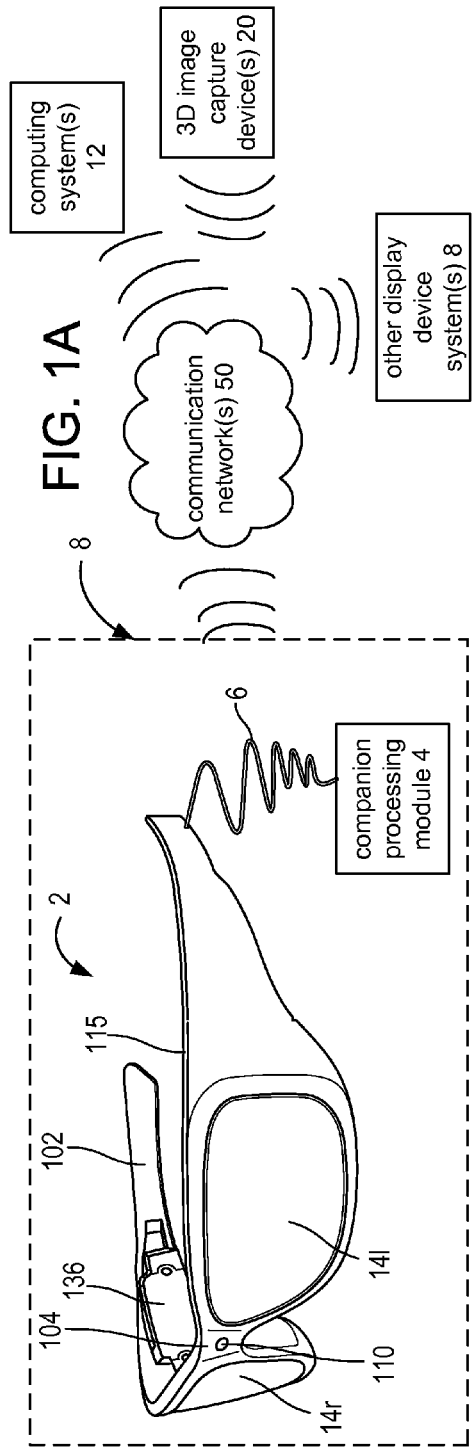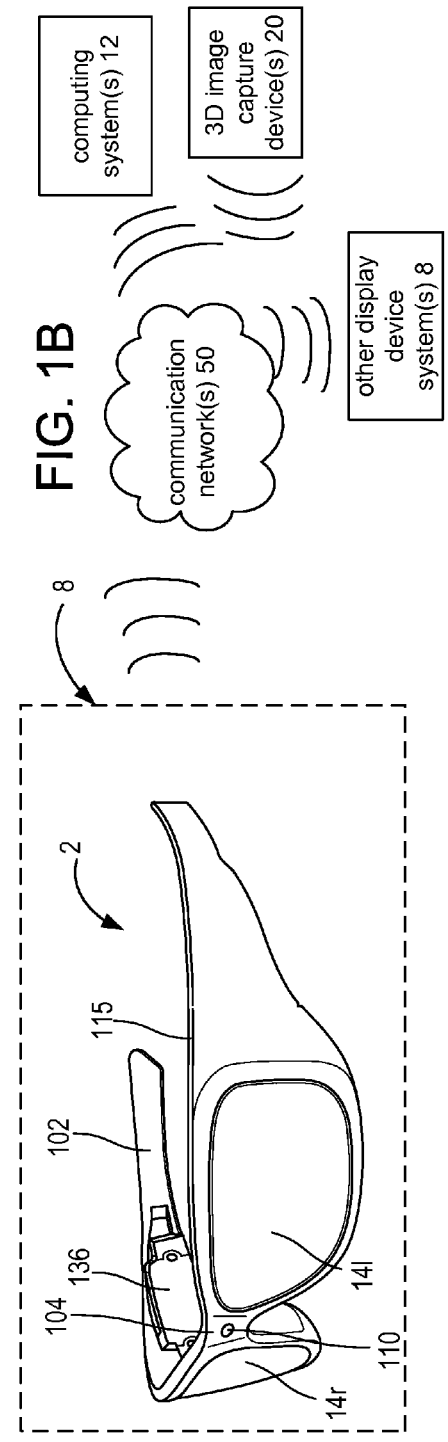

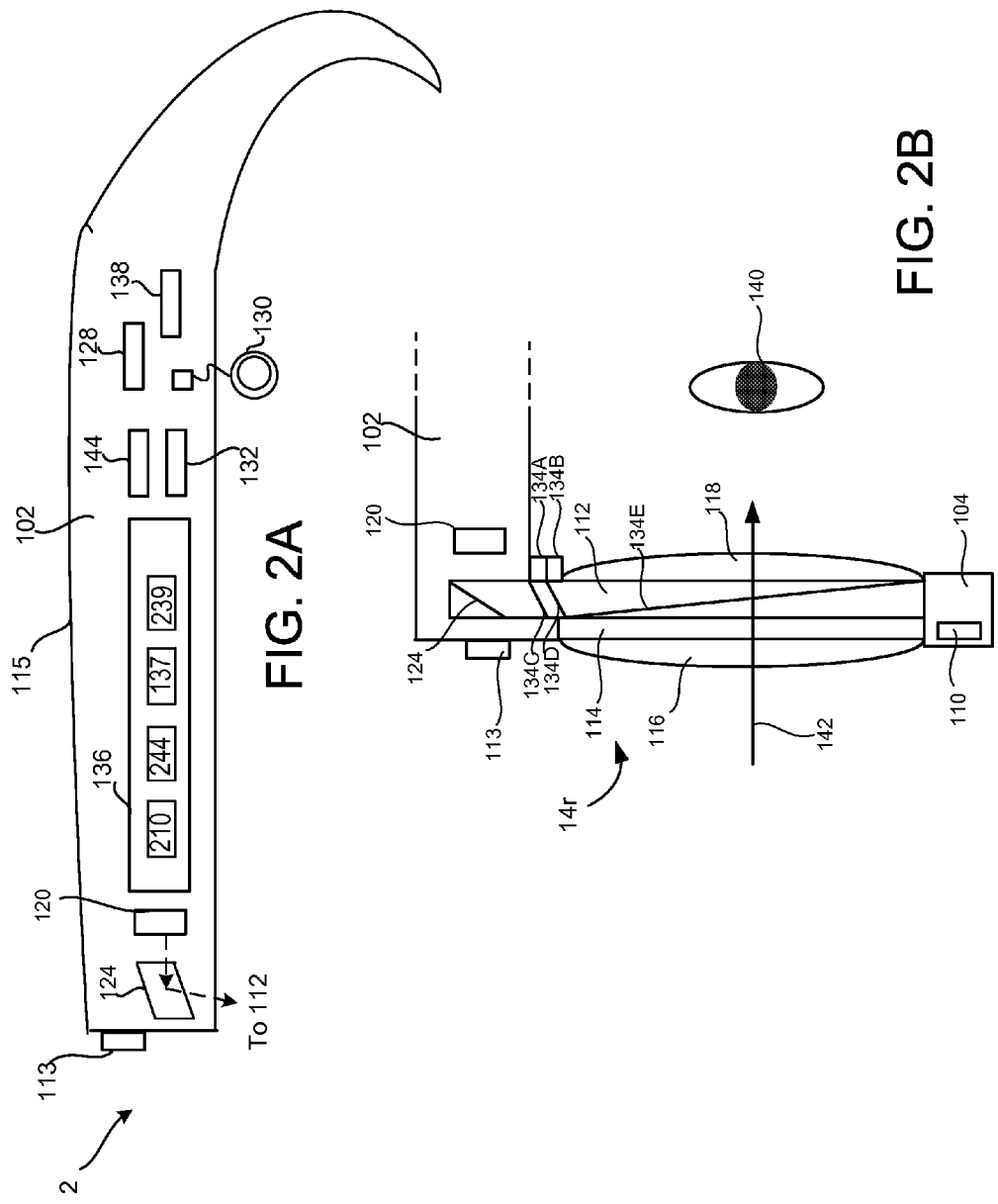

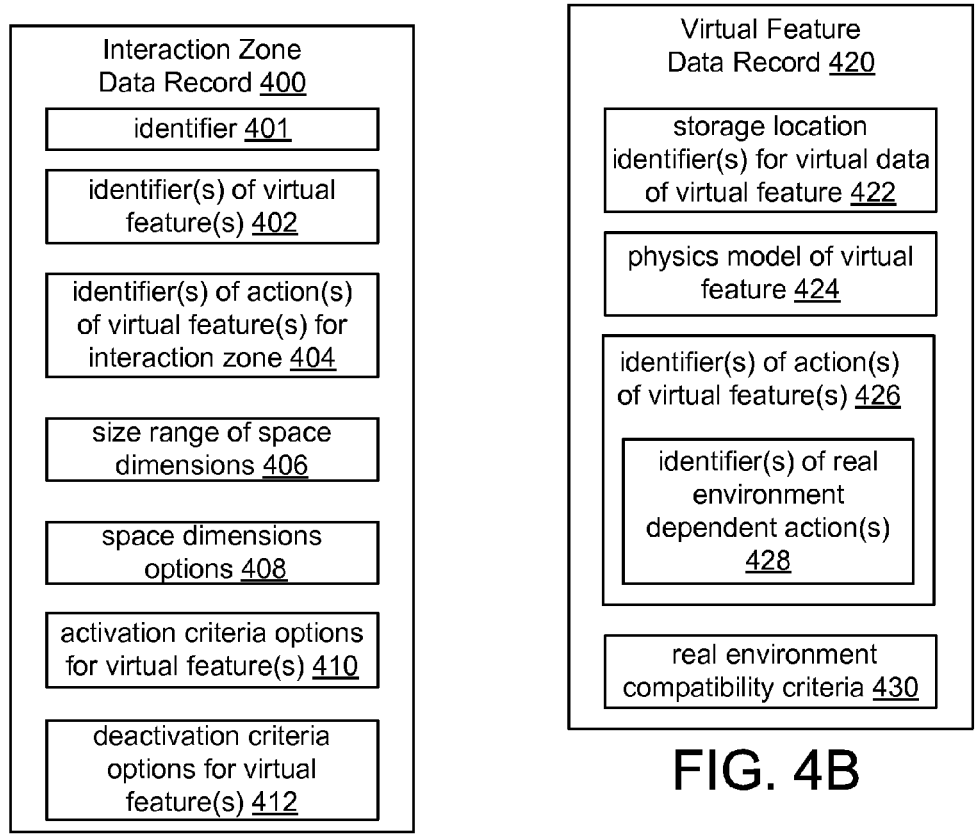
FIG. 4A
FIG. 4B
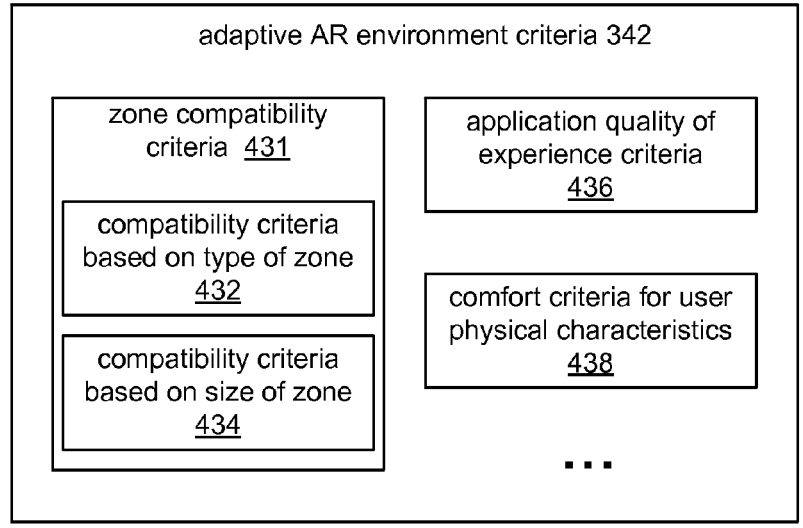
FIG. 4C

CONFIGURING AN INTERACTION ZONE WITHIN AN AUGMENTED REALITY ENVIRONMENT

BACKGROUND

A consistent, quality experience for an application meets at least key objectives of the application like editing a document for a word processing application or completing a car race in a game application for every execution. Today, application developers continue to try to provide a consistent, quality experience when using an application regardless of upon which type of computer device the application is executing. For example, in the gaming context, a user may start a game on his mobile device on the way home and desire to continue the game at home on his gaming console. The different capabilities of computer devices present challenges effecting a consistent quality of user experience. However, a typical computer device updates a rectangular display screen with content which is entirely generated and controlled by the computer device albeit in response to user input.

SUMMARY

One of the advantages of using a near-eye, augmented reality display device system is the ability to execute an application wherever you are and using your current real environment, which is not under computer control, as part of your display view. The real environment is a factor in the quality of experience for an application being executed by a near-eye, augmented reality (AR) display system. The technology described herein provides for adaptively configuring one or more interaction zones within an augmented reality environment. An AR environment includes a real world environment and at least one virtual feature. In one example, an interaction zone includes at least one virtual feature, real environment compatibility criteria for the at least one virtual feature, space dimensions and activation criteria for the at least one virtual feature.

The technology provides one or more embodiments of a method for adaptively configuring one or more interaction zones within an augmented reality environment which includes a real world environment and at least one virtual feature. An embodiment of the method comprises automatically selecting one or more interaction zone candidates based on one or more real environment features of the real environment satisfying real environment compatibility criteria for each candidate being identified in a (3D) mapping of the augmented reality environment. One or more interaction zones which satisfy zone compatibility criteria are automatically selected for configuration within the AR environment from the one or more candidates. The 3D mapping is updated with 3D space position data for the one or more interaction zones selected for configuration in the AR environment. At least one virtual feature of at least one of the selected interaction zones is displayed by a near-eye, AR display responsive to application execution criteria being satisfied, and the at least one virtual feature being within a display field of view of the near-eye, augmented reality display.

The technology provides one or more embodiments of a system for adaptively configuring one or more interaction zones within an augmented reality environment which includes a real environment and at least one virtual feature. An embodiment of the system comprises a near-eye, augmented reality display having a display field of view and being supported by a near-eye support structure. One or more processors are communicatively coupled to the near-eye, augmented reality display for controlling the display and have access to memory storing a three dimensional (3D) mapping of the augmented reality environment including 3D space positions for objects in the augmented reality environment.

The memory stores interaction zone data for an interaction zone including an identifier of a virtual feature, a storage location identifier of virtual data for display of the virtual feature, space dimensions for the interaction zone, real environment compatibility criteria, activation criteria for the interaction zone, and one or more actions for performance by the virtual feature including one or more real environment dependent actions.

The one or more processors automatically configure one or more interaction zones at 3D space positions in the 3D mapping of the augmented reality environment based on one or more real environment features satisfying the real environment compatibility criteria.

The technology provides one or more embodiments of one or more processor readable storage devices comprising instructions encoded thereon which instructions cause one or more processors to execute a method for controlling activation of one or more interaction zones within an augmented reality environment including a real environment and at least one virtual feature by a near-eye, augmented reality display system. An embodiment of an interaction zone may include at least one virtual feature, space dimensions and one or more boundaries, activation criteria for the interaction zone, and deactivation criteria for the interaction zone. An embodiment of the method comprises adaptively configuring one or more interaction zones within an augmented reality environment.

Natural user interface input data is identified from data captured by a capture device of the near-eye, augmented reality display device system indicating at least one user physical action by at least one body part of a user wearing the near-eye, augmented reality display device system. Responsive to the at least one user physical action satisfying the activation criteria for the at least one interaction zone, displaying the at least one change of one or more virtual features associated with the interaction zone responsive to the at least one user physical action. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a near-eye augmented reality display device system embodied as an optical see-through, augmented reality display device system.

FIG. 1B is a block diagram depicting example components of another embodiment of an optical see-through, augmented reality display device system.

FIG. 2A is a side view of an eyeglass temple of a frame in an embodiment of the near-eye, augmented reality display device embodied as eyeglasses providing support for hardware and software components.

FIG. 2B is a top view of an embodiment of a display optical system of an optical see-through, near-eye, augmented reality display device.

FIG. 4A is a block diagram illustrating an example of an interaction zone data record.

FIG. 4B is a block diagram illustrating an example of a virtual feature data record.

FIG. 4C is a block diagram illustrating an example of adaptive augmented reality environment criteria.

DETAILED DESCRIPTION

Figure 3A:
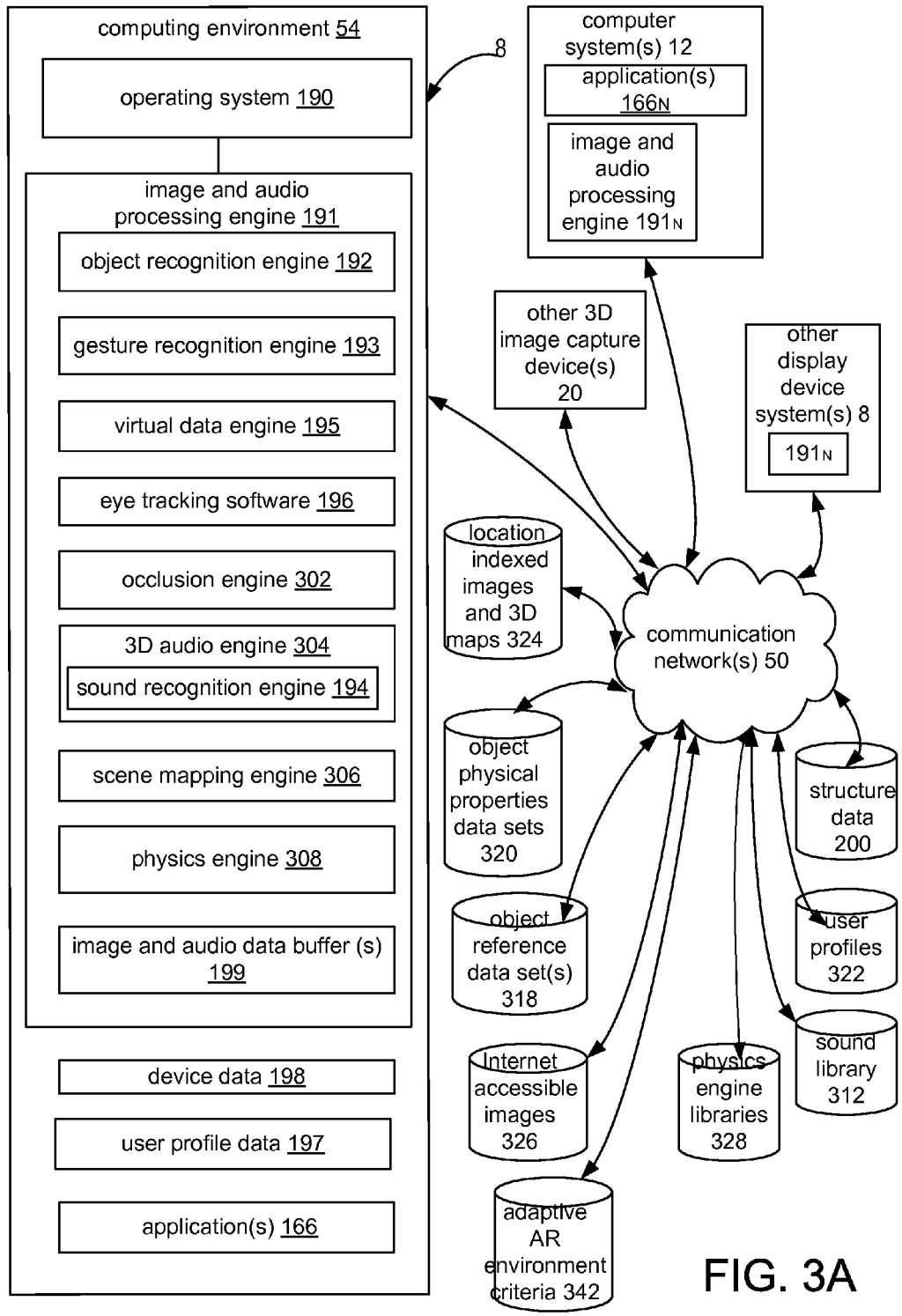
FIG. 3A is a block diagram of an embodiment of a system for adaptively configuring one or more interaction zones within an AR environment for display by a near-eye, AR display.

A user expects a certain quality of experience wherever an application is executed. For example, a degree of difficulty may be associated with a good game experience. For maintaining the degree of difficulty across real environments with different real features, for example an outdoor area versus a room in a house, adaptive augmented reality (AR) environment criteria when applied by an application may vary the number, size and type of virtual objects in the environment. The actions a virtual object may perform or a performance parameter like speed or force may be varied. The adaptive AR environment criteria are flexible in that they provide fallback criteria or alternative criteria based on the real features mapped in the user environment. A real object is a real feature. Some other examples of real features, which are not object specific, include a real surface, size dimensions of an application operation space, and ambient effects like lighting in the application operation space.

An application can also adaptively configure one or more interactions zones in an AR environment. As mentioned above, an AR environment includes a real world environment with at least one virtual feature. An interaction zone occupies a space with one or more boundaries including at least one virtual feature. The space occupied by the zone may be fixed when placed in the augmented reality environment or may be associated with a movable object like a moving virtual object or a real user. There may be different types of interaction zones defined by an application based on its objectives in which different activities occur. The different types may be identified by their different virtual features for implementing the different objects. In adaptive configuration, bases for determining where to configure or where to place a zone include the availability of a compatible real feature in the environment to which a virtual feature may be registered, and the size and shape of the zone. As discussed below, an interaction zone may have adjustable size and shape, and a selection of alternative virtual features for assisting with configuration.

A virtual feature associated with an interaction zone is activated in accordance with activation criteria provided by the controlling application and is deactivated in accordance with deactivation criteria provided by the controlling application. Activation may include one or more virtual objects associated with the zone performing one or more actions, for example providing a clue for finding a treasure in a game via audiovisual data, or a virtual object or virtual feature which is not object specific changing a state of appearance or playing audio data. Some examples of a virtual feature are one or more actions performed by a virtual object, for example an animation, a visual effect or a virtual object which appears registered to a real object in the environment. A virtual feature which is registered to an object, real or virtual, means the data tracks its position in a display field of view of a near-eye, augmented reality display in reference to or dependent upon a position of the object to which it is registered.

A user using a near-eye, augmented reality display device system sees virtual objects displayed with real objects in real time. In particular, a user wearing a see-through, augmented reality display device system actually sees with his or her natural sight a real object, which is not occluded by image data of a virtual object or virtual effects, in a display field of view of the see-through display, hence the names see-through display and optical see-through display. For other types of augmented reality displays like video-see displays, sometimes referred to as video see-through displays, or a display operating in a video-see mode, the display is not really see-through because the user does not see real objects with his natural sight but sees displayed image data of unoccluded real objects as they would appear with natural sight as well as image data of virtual objects and virtual effects. References to a see-through display below are referring to an optical see-through display.

The term "display field of view" refers to the field of view of the display portion of the display device system as the display portion is what the user looks through. In other words, the display field of view approximates a user field of view as seen from a user perspective. In some embodiments, the display field of view, may be mapped by a view dependent coordinate system, having orthogonal X, Y and Z axes in which a Z-axis represents a depth position from a reference point, for example a reference point on or near the display portion of the device.

Image data may be moving image data like video as well as still image data. Image data may also be three dimensional. An example of 3D image data is a hologram. Image data may be that captured, and in some examples displayed, of real objects, or image data may be generated to illustrate virtual objects or imagery. Virtual image data, referred to hereafter as virtual data, is image data of a virtual object or virtual effect. An example of a virtual effect is an atmospheric condition like fog or rain. Another example may be a simulated effect on a real object, like a smashing of a window when the real is still intact, or a displayed change of color of one's shirt.

FIG. 1A is a block diagram depicting example components of an embodiment of a see-through, augmented or mixed reality display device system. System 8 includes a near-eye, see-through, augmented reality display device as a near-eye, augmented reality display device 2 in communication with a companion processing module 4 via a wire 6 in this example or wirelessly in other examples. In this embodiment, head mounted display device 2 is in the shape of eyeglasses in a frame 115, with a display optical system 14 for each eye in which image data is projected into a user's eye to generate a display of the image data while a user also sees through the display optical systems 14 for an actual direct view of the real world. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through, augmented reality display, and the two display optical systems 14 together may also be referred to as a see-through, augmented reality display 14.

Frame 115 provides a support structure for holding elements of the system in place as well as a conduit for electrical connections. In this embodiment, frame 115 provides a convenient eyeglass frame as support for the elements of the system discussed further below. Some other examples of a near-eye support structure are a visor frame or a goggles support. The frame 115 includes a nose bridge 104 with a microphone 110 for recording sounds and transmitting audio data to control circuitry 136. A side arm or temple 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing capture devices 113, e.g. cameras, for recording digital image data such as still images, video or both, and transmitting the visual recordings to the control circuitry 136 which may in turn send the captured image data to the companion processing module 4 which may also send the data to one or more computer systems 12 over a network 50.

The companion processing module 4 may take various embodiments. In some embodiments, companion processing module 4 is a separate unit which may be worn on the user's body, e.g. a wrist, or be a separate device like a mobile device (e.g. smartphone). The companion processing module 4 may communicate wired or wirelessly (e.g., WiFi, Bluetooth, infrared, RFID transmission, wireless Universal Serial Bus (WUSB), cellular, 3G, 4G or other wireless communication means) over one or more communication networks 50 to one or more computer systems 12 whether located nearby or at a remote location, other display device systems 8 in a location or environment and, if available, one or more 3D image capture devices 20 in the environment. In other embodiments, the functionality of the companion processing module 4 may be integrated in software and hardware components of the display device 2 as in FIG. 1B. Some examples of hardware components of the companion processing module 4 are shown in FIG. 9.

One or more remote, network accessible computer system(s) 12 may be leveraged for processing power and remote data access. An example of hardware components of a computer system 12 is shown in FIG. 9. The scale and number of units may vary considerably for different embodiments of the computer system 12 and the companion processing module 4. An application may be executing on computer system 12 which interacts with or performs processing for an application executing on one or more processors in the see-through, augmented reality display device system 8. For example, a 3D mapping application may be executing on the one or more computer systems 12 and the user's display device system 8. In some embodiments, the application instances may perform in a master and client role in which a client copy is executing on the display device system 8 and performs 3D mapping of its display field of view, receives updates of the 3D mapping from the computer system(s) 12 including updates of objects in its view from the master 3D mapping application and sends image data, and depth and object identification data, if available, back to the master copy.

The display device system 8 may also communicate with one or more other display device systems 8. For example, in some embodiments, the 3D mapping application executing on different display device systems 8 in the same environment share data updates, for example object identifications and occlusion data like an occlusion volume for a real object, in real time in a peer-to-peer configuration between devices.

An example of an environment is a 360 degree visible portion of a real location in which the user is situated. A user may be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

In the illustrated embodiments of FIGS. 1A and 1B, the one or more computer systems 12 and the display device system 8 also have network access to one or more 3D image capture devices 20 which may be, for example, one or more cameras that visually monitor one or more users and the surrounding space such that gestures and movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. a game application). The image and depth data of the one or more 3D capture devices 20 may supplement data captured by one or more capture devices 113 on the near-eye, AR display device 2 and other such AR display devices 8 in an environment or location for 3D mapping, gesture recognition, object recognition and other functions as discussed further below.

A capture device 20 may be a depth camera positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a see-through, augmented, or mixed, reality display device system 8 which may communicate over one or more communication networks 50 with one or more network accessible computer systems 12. The display device system 8 may also communicate with one or more 3D image capture devices 20 if available and other display device systems 8 if desired over one or more communication networks 50. In this embodiment, the control circuitry 136 of the display device 2 incorporates the functionality which a companion processing module provides in FIG. 1A and communicates wirelessly via a wireless transceiver (see wireless interface 137 in FIG. 2A) over one or more communication networks 50 to one or more computer systems 12 whether located nearby or at a remote location, other display device systems 8 in a location or environment and, if available, a 3D image capture device in the environment 20.

FIG. 2A is a side view of an eyeglass temple 102 of the frame 115 in an embodiment of the see-through, augmented reality display device 2 embodied as eyeglasses providing support for hardware and software components. At the front of frame 115 is depicted one of at least two physical environment facing capture devices 113, e.g. cameras, that can capture image data like video and still images, typically in color, of the real world to map real objects in the display field of view of the see-through display, and hence, in the field of view of the user.

In some examples, the capture devices 113 may also be depth sensitive, for example, they may be depth sensitive cameras which transmit and detect infrared light from which depth data may be determined In other examples, a separate depth sensor (not shown) on the front of the frame 115 may also capture and provide depth data to objects and other surfaces in the field of view. The depth data and image data form a depth map of the captured field of view of the capture devices 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing capture devices 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The capture devices 113 are also referred to as outward facing capture devices meaning facing outward from the user's head. The illustrated capture device 113 is a front facing capture device which is calibrated with respect to a reference point of its respective display optical system 14. One example of such a reference point is an optical axis (see optical axis 142 in FIG. 2B) of its respective display optical system 14. The calibration allows the field of view of the display optical systems 14, also referred to as the display field of view, to be determined from the data captured by the capture devices 113.

Control circuitry 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the capture devices 113, the microphone 110 and the sensing units discussed below. The processing unit 210 may comprise one or more processors including a central processing unit (CPU) and a graphics processing unit (GPU), particularly in embodiments without a separate companion processing module 4, which contains at least one graphics processing unit (GPU).

Inside, or mounted to temple 102, are an earphone of a set of earphones 130, an inertial sensing unit 132 including one or more inertial sensors, a location sensing unit 144 including one or more location or proximity sensors, some examples of which are a GPS transceiver, an infrared (IR) transceiver, or a radio frequency transceiver for processing RFID data. Optional electrical impulse sensing unit 128 detects commands via eye movements. In one embodiment, inertial sensing unit 132 includes as sensors a three axis magnetometer, a three axis gyro, and a three axis accelerometer. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensing units 144, 132, 128 and earphones 130 as well as the microphone 110, capture devices 113 and an IR illuminator 134A, and an IR detector or camera 134B discussed below.

Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object and which can interact with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a light guide optical element 112, which directs the light representing the image into the user's eye.

FIG. 2B is a top view of an embodiment of one side of a see-through, near-eye, augmented reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by an arrow representing an optical axis 142 of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment. A representative reflecting element 134E represents the one or more optical elements like mirrors, gratings, and other optical elements which direct visible light representing an image from the planar waveguide towards the user eye 140.

Infrared illumination and reflections also traverse the planar waveguide for an eye tracking system 134 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) an eye tracking IR sensor 134B (e.g. IR camera, arrangement of IR photodetectors, or an IR position sensitive detector (PSD) for tracking glint positions), wavelength selective filters 123 and 125, and the representative reflecting element 126. In this embodiment, representative reflecting element 134E also implements bidirectional infrared (IR) filtering which directs IR illumination towards the eye 140, preferably centered about the optical axis 142 and receives IR reflections from the user eye 140. In some examples, as part of an integrated eye tracking and display system, reflecting element 134E may include a hot mirror or gratings for implementing the bidirectional IR filtering. A wavelength selective filter 134C passes through visible spectrum light from the reflecting surface 124 and directs the infrared wavelength illumination from the eye tracking illumination source 134A into the planar waveguide. Wavelength selective filter 134D passes the visible light and the infrared illumination in an optical path direction heading towards the nose bridge 104. Wavelength selective filter 134D directs infrared radiation from the waveguide including infrared reflections of the user eye 140, preferably including reflections captured about the optical axis 142, out of the light guide optical element 112 embodied as a waveguide to the IR sensor 134B.

Based on eye tracking data from the eye tracking system 134 and image and depth data captured by front facing capture devices 113, a point of gaze is determined by one or more processors of the display device system 8. In one example of determining gaze, the eye tracking software executing on the one or more processors identifies a pupil position within each eye and models a gaze line for each eye extending from an approximated location of a respective fovea. The one or more processors determine a position in the display field of view where the gaze lines meet. This intersection is the point of gaze and it is within the Panum's fusional area for human eyes which is the area in which objects are in focus. Based on a 3D mapping of objects in the display field of view (see discussion of scene mapping engine in FIG. 3A), an object at which the gaze lines meet is an object of focus.

In other embodiments, the eye tracking unit optics are not integrated with the display optics. For more examples of eye tracking systems for HMD devices, see U.S. Pat. No. 7,401, 920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors in sensing unit 128, in some embodiments, are mounted by the user's ears (near earphones 130) to detect the electrical potential while the eyes move around and effectively read out what the eyes are doing in real time. (See *Control your mobile music with eyeball-activated earphones!*, Feb. 19, 2010, http://www-.wirefresh.com/control-your-mobile-music-with-eyeball-actvated-headphones, which is hereby incorporated by reference.) Eye blinks may be tracked as commands. Other embodiments for tracking eye movements such as blinks which are based on pattern and motion recognition in image data from a small eye tracking camera 134B can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. The opacity filter may also be used for occlusion processing. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B show half of the head mounted display device 2. A full head mounted display device may include another set of optional see-through lenses 116 and 118, another opacity filter 114, another light guide optical element 112, another image generation unit 120, physical environment facing capture device 113 (also referred to as outward facing or front facing capture device 113), eye tracking system 134, earphone 130, and sensing unit 128 if present. In some embodiments, there may be a continuous display viewed by both eyes, rather than a display optical system for each eye. Additional details of a head mounted display device system are illustrated in U.S. patent application Ser. No. 12/905,952 entitled Fusing Virtual Content Into Real Content, Filed Oct. 15, 2010, fully incorporated herein by reference.

A perspective is where a user is looking from, and a display field of view is what a user sees from the perspective. The term user perspective includes approximations of a user perspective with varying degrees of accuracy. For example, the user perspective may be determined using parameters without regard to specific eye data for a specific user. In other examples, more sophisticated techniques may use individual gaze and eye tracking data to more precisely pinpoint from where a user is looking.

In some embodiments, a user perspective is determined from the position and orientation of the object in the display field of view. The display field of view can be defined in terms of a view dependent coordinate system. The view dependent coordinate system moves with the display as the user's head moves. (In contrast, a 3D mapping of an environment using a view independent coordinate system has a fixed origin in the environment.) In one example, the view dependent coordinate system is an orthogonal X, Y, Z system which has a depth axis extending from the display device so the display field of view represents what is in front of the user's eyes so the display field of view is what is identified by the display device system 8 as being that which is seen from the user perspective.

The front facing capture devices 113 provide image and depth data from which real objects are identified as well as their positions and often orientations relative to the display portion of the device. Many objects have distinct sides with respect to a center of mass, a center of volume or some other fixed reference point of the object. For example, using a fixed reference point for a chair, object recognition software on the display device system 8 or executing for it can identify from image data a front side of a chair, a back, a right side and a left side. The determination of an orientation for some objects, for example a basketball, may not be apparent from image data. A virtual object is generated by an application and is displayed at a position and orientation in the view dependent coordinate system as the user would see it if it were a real object. The position of at least one point on the object in terms of the view dependent coordinate system along with object properties information like size and shape of the object identify its positional volume and often orientation relative to one or more reference points (e.g. optical axes) on the display portion of the display device. In some instances, positions of the user's foveae may be approximated in reference to the one or more reference points. In other words, both real and virtual objects are displayed in the display field of view as they are seen from the user perspective.

FIG. 3A is a block diagram of an embodiment of a system from a software perspective for controlling a virtual object displayed by an augmented reality display device system, an example of which is a near-eye, see-through display device system. FIG. 3A illustrates a computing environment embodiment 54 from a software perspective which may be implemented by a system like display device system 8, one or more remote computer systems 12 in communication with one or more display device systems or a combination of these. Additionally, display device systems can communicate with other display device systems for sharing data and processing resources. Network connectivity allows leveraging of available computing resources. As shown in the embodiment of FIG. 3A, the software components of a computing environment 54 comprise an image and audio processing engine 191 in communication with an operating system 190. Image and audio processing engine 191 processes image data (e.g. moving data like video or still), and audio data in order to support applications executing for a head mounted display (HMD) device system like a see-through, augmented reality display device system 8. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, a scene mapping engine 306, an occlusion engine 302 and a physics engine 308 which may communicate with each other.

The computing environment 54 also stores data in image and audio data buffer(s) 199. The buffers provide memory for receiving image data captured from the outward facing capture devices 113, image data captured by other capture devices if available, image data from an eye tracking camera of an eye tracking system 134 if used, buffers for holding image data of virtual objects to be displayed by the image generation units 120, and buffers for both input and output audio data like sounds captured from the user via microphone 110 and sound effects for an application from the 3D audio engine 304 to be output to the user via earphones 130.

Image and audio processing engine 191 processes image data (e.g. video or image), depth and audio data received from one or more capture devices which may be available in a location. Image and depth information may come from the outward facing capture devices 113 captured as the user moves his head or body and additionally based on captured data from other display device systems 8 and other image data captured of the location such as stored image data and maps 324 or provided by other 3D image capture devices 20 in the location, e.g. capture devices 20A and 20B in FIGS. 7A through 7E.

The individual engines and data stores depicted in FIG. 3A are described in more detail below, but first an overview of the data and functions they provide as a supporting platform from the perspective of an application 166 is described. An application 166 executing in the near-eye, augmented reality display device system 8 or executing remotely on a computer system 12 for the display device system 8 leverages the various engines of the image and audio processing engine 191 for implementing its one or more functions by sending requests identifying data for processing and receiving notification of data updates. For example, notifications from the scene mapping engine 306 identify the positions of virtual and real objects at least in the display field of view. The application 166 identifies data to the virtual data engine 195 for generating the structure and physical properties of an object for display. The application 166 may supply and identify a physics model for each virtual object generated for its application to the physics engine 308, or the physics engine 308 may generate a physics model based on the object physical properties data set 320N for the object.

The operating system 190 makes available to applications 166 which gestures the gesture recognition engine 193 has identified, which words or sounds the sound recognition engine 194 has identified, the positions of objects from the scene mapping engine 306 as described above, and eye data such as a position of a pupil or an eye movement like a blink sequence detected from the eye tracking software 196. A sound to be played for the user in accordance with the application 166 can be uploaded to a sound library 312 and identified to the 3D audio engine 304 with data identifying from which direction or position to make the sound seem to come from. The device data 198 makes available to the application 166 location data, head position data, data identifying an orientation with respect to the ground and other data from sensing units of the display device 2.

The scene mapping engine 306 is first described. A 3D mapping of the display field of view of the augmented reality display can be determined by the scene mapping engine 306 based on captured image data and depth data for the display field of view. The 3D mapping includes 3D space positions or position volumes for objects. A 3D space is a volume of space occupied by the object. Depending on the precision desired, the 3D space can match the 3D shape of the object or be a less precise bounding volume around an object some examples of which are a bounding box, a bounding 3D ellipse, a bounding sphere or a bounding cylinder. A 3D space position represents position coordinates for the boundary of the volume or 3D space. In other words, the 3D space position identifies how much space an object occupies and where in the display field of view or a view independent mapping of an environment that occupied space is.

A depth map can represent the captured image data and depth data. A view dependent coordinate system may be used for the mapping of the display field of view as how a collision between objects appears to a user depends on the user's point of view. An example of a view dependent coordinate system is an x, y, z coordinate system in which the z-axis or depth axis extends orthogonally or as a normal from the front of the see-through display. In some examples, the image and depth data for the depth map representing the display field of view is received from the capture devices 113 on the front of the display device 2. The display field of view may also be determined remotely or using a combination of remote (e.g. 12 or another display device system 8) and local processing.

Mapping what is around the user in the user's environment can be aided with sensor data. Data from an orientation sensing unit 132, e.g. a three axis accelerometer and a three axis magnetometer, determines position changes of the user's head and correlation of those head position changes with changes in the image and depth data from the front facing capture devices 113 can identify positions of objects relative to one another and at what subset of an environment a user is looking. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 306 can also use a view independent coordinate system for 3D mapping. The map can be stored in the view independent coordinate system in a storage location (e.g. 324) accessible as well by other display device systems 8, other computer systems 12 or both, be retrieved from memory and be updated over time as one or more users enter or re-enter the environment. In some examples, image and object registration into a common coordinate system may be performed using an extrinsic calibration process. The registration and alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 306 may first search for a pre-generated 3D map identifying 3D space positions and identification data of objects stored locally or accessible from another display device system 8 or a network accessible computer system 12. The map may include stationary objects. The map may also include objects moving in real time and current light and shadow conditions if the map is presently being updated by another system. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible database like image and map database(s) 324.

The environment may be identified by location data which may be used as an index to search in location indexed image and pre-generated 3D map databases 324 or in Internet accessible images 326 for a map or image related data which may be used to generate a map. For example, location data such as GPS data from a GPS transceiver of the location sensing unit 144 on the display device 2 may identify the location of the user. Additionally, an IP address of a WiFi hotspot or cellular station to which the display device system 8 has a connection can identify a location. Cameras at known positions within a location may identify the user and other people through facial recognition. Additionally, identifier tokens may be exchanged between display device systems 8 via infra-red, Bluetooth or WUSB. The range of the infra-red, WUSB or Bluetooth signal can act as a predefined distance for determining proximity of another user. Maps and map updates, or at least object identification data may be exchanged between display device systems via infra-red, Bluetooth or WUSB as the range of the signal allows.

An example of image related data which may be used to generate a map is meta data associated with any matched image data, from which objects and their positions within a coordinate system for the environment can be identified. For example, a relative position of one or more objects in image data from the outward facing capture devices 113 of the user's display device system 8 can be determined with respect to one or more GPS tracked objects in the location from which other relative positions of real and virtual objects can be identified.

As described in the discussion of FIGS. 1A and 1B, image data for mapping an environment can come from capture devices other than those capture devices 113 on the user's display device 2. Image and depth data from multiple perspectives can be received in real time from other 3D image capture devices 20 under control of one or more network accessible computer systems 12 or from at least one other display device system 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment. The scene mapping engine 306 identifies the position and tracks the movement of real and virtual objects in the volumetric space based on communications with the object recognition engine 192 of the image and audio processing engine 191 and one or more executing applications 166 generating virtual objects. The scene mapping engine 306 may be in communication with other scene mapping engines 306 executing in other systems (e.g. 12 and 8).

In some instances, a scene mapping engine 306 on a network accessible computer system 12 receives image data of multiple display fields of view from multiple see-through augmented reality display device systems 8 in an environment and correlates their image data based on capture times for the data in order to track changes of objects and lighting and shadow in the environment in real time. 3D map updates can then be sent to the multiple display device systems 8 in the environment. (For more information on collaborative scene mapping between HMDs like system 8 and network accessible computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

In some examples, a 3D mapping, whether it be a depth map generated by front facing capture devices 113 including a display field of view, a 3D mapping of an environment or a location in a view independent coordinate system, or somewhere in between, may be modeled as a 3D mesh of an environment. A mesh may comprise a detailed geometric representation of various features including real and virtual objects and surfaces thereof within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety. 3D mesh representations of virtual objects can be added.

The object recognition engine 192 of the image and audio processing engine 191 detects, tracks and identifies real objects in the display field of view and the 3D environment of the user based on captured image data and depth data if available or determined depth positions from stereopsis. The object recognition engine 192 distinguishes real objects from each other by marking object boundaries and comparing the object boundaries with structural data. One example of marking object boundaries is detecting edges within detected or derived depth data and image data and connecting the edges. The object boundary data is then compared with stored structure data in order to identify a type of object within a probability criteria. Besides identifying the type of object, an orientation of an identified object may be detected based on the comparison with the stored structure data 200, object reference data sets 318 or both. A polygon mesh may also be used to represent the object's boundary as mentioned above. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The structure data 200 may store structural information as image data or use image data as references for pattern recognition. The image data may also be used for facial recognition. The object recognition engine 192 may also perform facial and pattern recognition on image data of the objects based on stored image data from other sources as well like user profile data 197 of the user, other users profile data 322 accessible by a network accessible computer system 12, location indexed images and 3D maps 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in objects reference data sets 318.

Figure 3B:
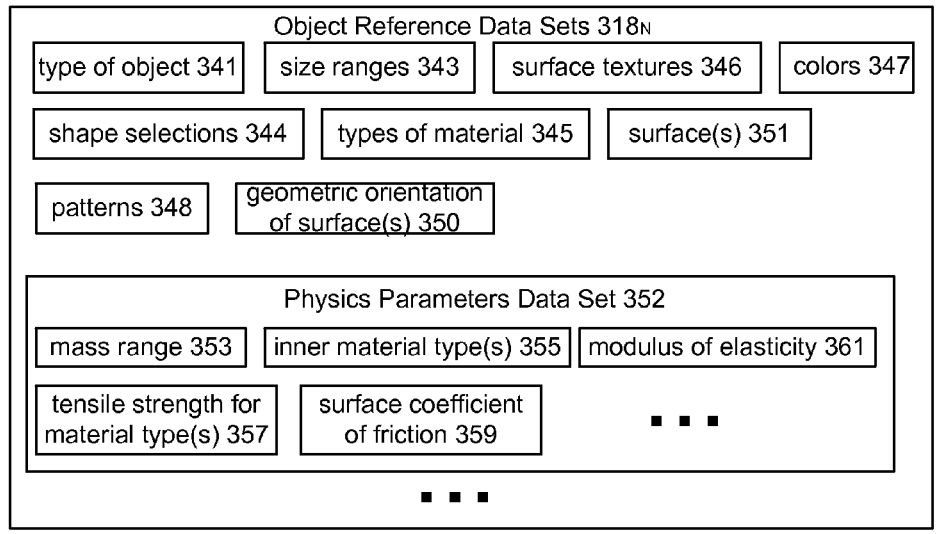
FIG. 3B illustrates an example of an object reference data set.

FIG. 3B illustrates an example of an object reference data set 318N with some examples of data fields which the data set may include. The object reference data sets 318 available to the object recognition engine 192 may have been predetermined manually offline by an application developer or by pattern recognition software and stored. Additionally, if a user takes inventory of an object by viewing it with the display device system 8 and inputting data for the data fields, an object reference data set is generated. Also, object reference data sets can be created and stored for sharing with other users as indicated in share permissions. Furthermore, the object recognition engine 192 can search accessible user profile data 197, 322 for information on objects in an environment. An example of such information is purchase data with product identifiers which can then be searched by the object recognition engine 192 in order to locate product descriptions with more details, for example in online catalog entries and product sites. The image data of the object may also be a basis for image searching for more descriptive data as may be found in metadata to fill in the data fields. This allows for more detailed object reference data sets 318.

Particularly, for an object recognition engine executing on one or more network accessible computer systems 12 with access to multiple users profile data 322 and more extensive computing and storage resources, such searching can be done in the background. Over time as the library or database of object reference data sets 318 grows, objects are recognized more quickly. In some embodiments, the object recognition engine 192 can automatically update data for a type of object data set and also automatically create a new data set for a previously unidentified type of object. In some examples implementing automatic update and automatic generation of new data sets, the object recognition engine 192 can display a message to the user or a database manager indicating additional data is available for a type of object or a previously unknown type of object in order to obtain permission before automatically generating the set. Either the user or the database manager can grant permission to update an existing data set or create and store a new one.

The data fields described below are representative examples and are not intended to be all inclusive. Furthermore, there may be a data set for a general type of object, like chair or car, and then data sets for specific types of chairs or cars. For example, a data set may include a base class object of chair and then sub-classes of chaise-lounge, folding chair, etc. with additional data fields for describing additional features specific to the sub-class. The illustrated data fields include a type of object 341 which may be a data record which also includes sub-fields. For the type of object 341, the other data fields provide data records identifying the types of physical properties available for the type of object. The other examples of data records include size ranges 343, shape selections available 344, typical types of material 345, colors available 347, patterns available 348, surface(s) available 351, typical surface texture(s) 346, and a geometric orientation 350 of each available surface 351.

There may also be stored a physics parameters data set 352 for each object reference data set 318N. The example physics parameters include a mass range 353 for the type of object 341, one or more inner material type(s) 355, a modulus of elasticity 361 for use with Hooke's Law, one or more tensile strengths associated with one or more material types 357 including at least a surface material type, and a surface coefficient of friction 359 associated with the surface material. Air may be considered a type of inner material. These parameters may be selected for a physics model representing an object for use by a physics engine 308 as discussed below.

Figure 3C:
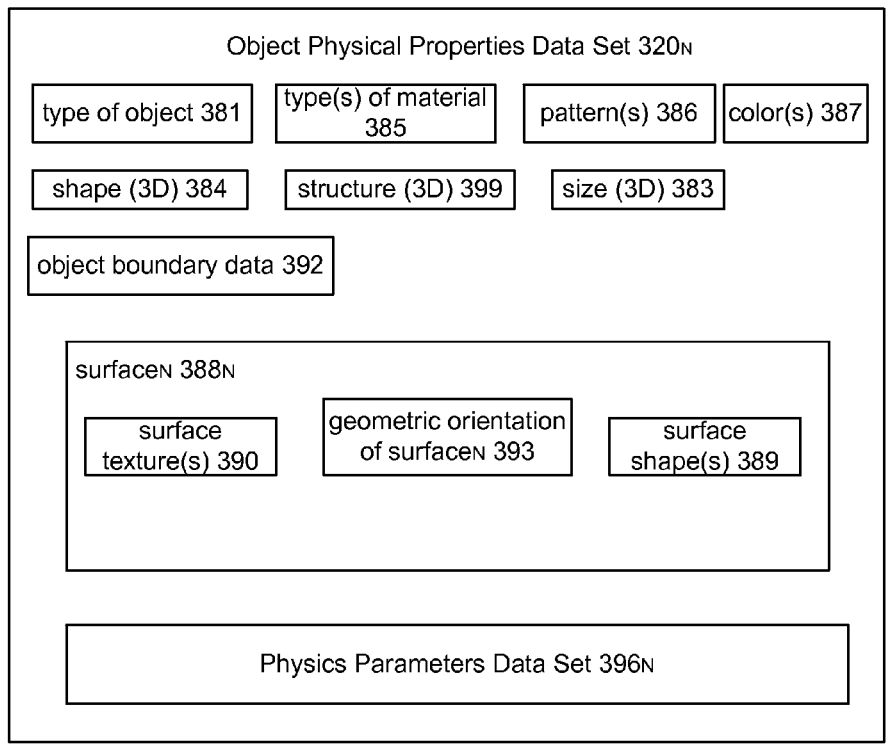
FIG. 3C illustrates some examples of data fields in an object physical properties data set.

FIG. 3C illustrates some examples of data fields in an object physical properties data set 320N stored for a real object, which includes data values detected or otherwise determined based on captured data of the real object, or for a specific virtual object. The data fields described below are representative examples and are not intended to be all inclusive. The example data fields include a type of object 381, size 383, in three dimensions in this example, shape 384, also 3D in this example, structure 399 (e.g. skeletal or for an inanimate object), also in three dimensions in this example, object boundary data 392, such as for example the determined edge data or a polygon mesh for a real object or the boundary data of a virtual object, and type(s) of material 385. For a real object, a type of surface material may be determined based on captured image data, and the types of inner material determined based on an object reference data set 318N or other object reference data source like 197, 322, 324, and 326. Some other exemplary data fields include pattern(s) 386 and colors 387 as well as surface(s) 388N.

Surface 388N represents an exemplary data set describing one or more surface properties for each surface identified. The data set includes one or more surface textures 390, a geometric orientation 393 of the surface N, and a surface shape 389 (e.g. flat, round, curvy, uneven, etc.).

For real objects, data is assigned to each of these data fields based on a weighted probability by the object recognition engine 192 as it detects object boundary data and colors and derives shapes and surfaces and looks up object reference data. These different properties are then weighted, and a probability is assigned whether an object in the image data is a certain type of object, and if the probability satisfies a criteria for a certain type of object, that type of object is assigned as the type of object 381 The object physical properties data set 320N is then stored in one or more network accessible data stores 320. A physics parameter data set 396N with data fields like those in the corresponding physics parameter data set 352, but with values for the specific real or virtual object, is also included in the object physical properties data set 320N. These are assigned by an application or the physics engine for virtual objects. For real objects, the physics data fields can be determined from object reference data sources based on the type of object 381 and physical properties determined by the object recognition engine 192.

The scene mapping engine 306 and the object recognition engine 192 exchange data which assist each engine in its functions. For example, based on an object identification and orientation determined by the object recognition engine 192, the scene mapping engine 306 can update a 3D space position or position volume for an object for more accuracy. For example, a chair on its side has a different volume than when it is right side up. A position history or motion path identified from position volumes updated for an object by the scene mapping engine 306 can assist the object recognition engine 192 track an object, particularly when it is being partially occluded.

Upon detection of one or more objects by the object recognition engine 192, image and audio processing engine 191 may report to operating system 190 an identification of each object detected and a corresponding position and orientation which the operating system 190 passes along to other executing applications like the scene mapping engine 306, the occlusion engine 302, the physic engine 308 and other upper level applications 166.

Some applications access over a network stored adaptive AR environment criteria 342 for effecting the placement and display of one or more virtual objects in a 3D mapping of an environment during their execution. For example, a gaming application may receive user input identifying boundaries for a playspace in which virtual objects can be positioned. For example, the user input data may be image and depth data from a capture device on the display device captured while a user is turning his head, gaze data captured while the user is gazing at boundary points and perhaps audio data captured by the microphone of the user speaking a command like "boundary". In other examples, an application automatically determines a playspace or operation space for the application based on a 3D mapping of the user environment or location. A 3D mesh may be used to represent the mapping of the environment. The adaptive AR environment criteria are flexible in that they provide fallback criteria or alternative criteria based on the real features (e.g. real surfaces, lighting, size dimensions of application operation space) mapped in the user environment.

As mentioned above, a user expects a certain quality of experience wherever an application is executed. Some examples for satisfying adaptive AR environment criteria are varying the number, size and type of virtual objects based on the current real environment. In other examples, the application 166 applying its adaptive AR environment criteria 342 may vary a type of action a virtual object may perform or a performance parameter, for example a speed of execution of the action, for effecting how the action is performed. Physics parameters for a virtual object, for example as may be defined in a physics parameters data set 352, may also be varied by the application 166 in accordance with its corresponding adaptive AR environment criteria 342 depending on the size and shape of the application operation space as identified in the 3D mapping of the environment. For example, a flexibility of a surface material may be altered to effect its springiness.

The adaptive criteria may also effect the appearance of displayed virtual objects for an application based on personal information of the user. The personal information may be stored in user profile data, whether stored locally (197) or in the cloud (322). For example, an application may have different versions of a ghost virtual object to be used for different age groups so as to not be too scary for younger children. Personal information related to physical characteristics may also be detected by the display device system from sensed data. For example, data from the inertial sensing unit 132 may identify a height of the near-eye display which approximates a height of a user's eyes. Additionally, a height may be approximated from a height of one or more real objects in a display field of view. In another example, a position of a virtual object in the environment may be adjusted based on the user's height so that the virtual object appears in the augmented reality display 14 within a comfort range of the user's eye level. Such a comfort level may be determined based on empirical studies of comfortable eye and neck angles. For more information, see U.S. patent application Ser. No. 13/288,350 entitled "Augmented Reality Playspaces with Adaptive Game Rules" Mount et al., and filed Nov. 3, 2011, which is hereby incorporated by reference.

The occlusion engine 302 identifies spatial occlusions between objects, and in particular between real and virtual objects based on spatial position data for recognized objects within a coordinate system as updated by the objection recognition engine 192 and the scene mapping engine 306. As virtual and real objects have size and shape, a 3D space position for each object may be defined by the scene mapping engine to incorporate the volume occupied by each object. In the case of complete occlusion of a virtual object by a real object, the occlusion engine can notify the virtual data engine to not display the virtual object. In the case of complete occlusion of the real object by the virtual object, the virtual object or its parts can be sized to completely cover the real object and its parts. For partial occlusions, the display is updated to show part of the virtual object and part of the real object. For more information about occlusion processing, see U.S. patent application Ser. No. 12/905,952 entitled "Fusing Virtual Content into Real Content," Flaks et al., and filed Oct. 15, 2010, which is hereby incorporated by reference and see also U.S. patent application Ser. No. 13/443,368 entitled "Realistic Occlusion for a Head Mounted Augmented Reality Display" Geisner et al., and filed Apr. 10, 2012, which is hereby incorporated by reference.

The 3D audio engine 304 is a positional 3D audio engine which receives input audio data and outputs audio data for the earphones 130 or other output audio devices like speakers in other embodiments. The received input audio data may be for a virtual object or be that generated by a real object. Audio data for virtual objects generated by an application can be output to the earphones to sound as if coming from the direction of the virtual object projected into the display field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference. Audio data from a sound library 312 may be associated with one or more collisions or actions for a particular physics model by an application or a user so that the 3D audio engine 304 will play the audio data during display of one or more collisions or actions.

Sound recognition engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, display device systems 8 and 3D image capture devices 20 in a location upload their captured audio data to a network accessible computer system 12. Additionally, pre-generated 3D maps of a location can provide an audio index of sounds of objects fixed in the location or which enter and leave the location on a regular basis, e.g. train and bus sounds.

An embodiment of a natural user interface (NUI) in one or more embodiments of the display device system 8 may comprise the outward facing capture devices 113 in conjunction with the object recognition engine 192 and gesture recognition engine 193 for identifying one or more user physical actions making up a gesture. Additionally, the 3D mapping of the display field of view or a user environment may identify one or more objects, real, virtual or both, with respect to which a gesture is performed or other types of user physical actions like eye and voice based actions discussed below. For example, a user may be point a virtual pool cue to touch a virtual highlighted area registered to a real object which activates an interaction zone registered to the real object. The eye tracking system 134 and the eye tracking software 196 for interpreting eye movements based on the data captured by the eye tracking system 134 may also be components in another embodiment of a a natural user interface. Eye based actions like a blink sequence indicating a command, a gaze pattern, or gaze duration identified by the eye tracking software 196 are also some examples of user physical actions of an eye which is a body part. The microphone and sound recognition software 194 can also be components of an embodiment of a natural user interface. Voice data is the result of user physical action by at least one body part like the larynx (voice box) and mouth. The different examples of natural user interface input, voice, eye-based action and gesture, may be used in combination to represent various user input which triggers processing by an application. For example, natural user input of voice commands may supplement other recognized user physical actions such as gestures and eye based actions.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The physics engine 308 simulates the physics of motion of objects and the exchange of energy between objects as forces are applied to them based on rules governing a physical environment. In the illustrative examples discussed herein, Newton's laws of physics are used as the illustrative rules for a physical environment. An application can define different physical environment rules. For example, an environment having a different gravitational force than Earth's can be requested by inputting different environmental parameters.

Physics engine libraries 328 are used by the physics engine 308 in updating physics models and simulating actions and effects like collision effects, sound effects and visual effects. Some examples of physics engine libraries 328 are as follows. One or more materials lookup tables in the libraries 328 can be referenced by the physics engine 308 for identifying physics parameters like tensile strength and coefficients of friction for different types of materials. A pre-collision events library includes data for representing events or actions, for example a gesture, which signal or trigger a collision. For example, an object landing on a certain area in an environment may be a trigger for an explosion. An action simulator library includes software instructions for simulating movement of at least a part of an object based on input parameters of one or more physical properties.

A collision effects library comprises software routines for simulating a change in at least one physical property of an object during or resulting from a collision based on different input parameters. For example, a collision effect may be a change in surface shape of an object to the collision. Other examples are different crack patterns or different breaking patterns for different materials or the same material in different orientations. The sound library 312, besides being a resource for command and object recognition based on sound, may also store audio data for sound effects to be played by the 3D audio engine 304 and which may be linked with different simulated actions, pre-collision events and collision effects. Similarly, a visual effects library may store routines for animations, highlighting, and other types of visual enhancements which may also be associated with particular actions, pre-collision events and collision effects.

The libraries 328 also store previously generated or stored virtual objects physics models and real objects physics models. Persistent object identifiers may be associated with the physics models so once a real object is recognized as a previously recognized object, the physics model can be retrieved from storage rather than regenerated to save time. Similarly, virtual objects previously registered by one or more applications 166 can be retrieved from the library as well. An application can register virtual objects and pre-collision events and the associated visual effects, sound effects, and collision effects for the triggered respective collisions via a software interface with the physics engine 308.

For more information about a physics engine like physics engine 308 which models virtual and real objects, and collisions, and collision effects for a near-eye, AR display, see U.S. patent application Ser. No. 13/458,800, McCulloch et al., entitled "Displaying a Collision Between Real and Virtual Objects," filed Apr. 27, 2012, which is hereby incorporated herein by reference.

Virtual data engine 195 processes virtual objects and registers the 3D position and orientation of virtual objects or imagery in relation to one or more coordinate systems, for example in display field of view coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

The following discussion describes some example processing for updating an optical see-through, augmented reality display to position virtual objects so that they appear realistically at 3D locations determined for them in the display. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 only displays the virtual objects as the display device is a see-through display device. For a virtual object, the virtual data engine 195 has a target 3D space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

For a video-see, augmented reality display or operation of a see-through display in a video-see mode, image data of the real objects is also written into the corresponding color buffer with the virtual objects. The opacity filter of each see-through display optical system 14 can be tuned so that light reflected from in front of the glasses does not reach the user's eye 140 and the 3D image data of both the real and virtual objects is played on the display.

Device data 198 may include an identifier for the computer system 8, a network address, e.g. an IP address, model number, configuration parameters such as devices installed, identification of the operating system, and what applications are available in the display device system 8 and are executing in the display device system 8 etc. Particularly for the see-through, augmented reality display device system 8, the device data may also include data from sensors or sensing units or determined from the sensors or sensing units like the orientation sensors in inertial sensing unit 132, the temperature sensor 138, the microphone 110, the electrical impulse sensing unit 128 if present, and the one or more location and proximity transceivers in location sensing unit 144.

User profile data, in a local copy 197 or stored in a cloud based user profile 322 has data for user permissions for sharing or accessing of user profile data and other data detected for the user like location tracking, objects identified which the user has gazed at, biometric data or determined states of being of the user.

FIGS. 4A, 4B and 4C provide examples of data which may be associated with an interaction zone, a virtual feature and adaptive AR environment criteria. The data may be used by an application in configuring interaction zones within an AR environment and also for selecting how activation and deactivation of a virtual feature is determined and controlling activation and deactivation of the virtual feature. The data fields described below are representative examples and are not intended to be all inclusive.

FIG. 4A is a block diagram illustrating an example of an interaction zone data record 400 which includes examples of data which may be associated with an interaction zone. The data fields include an identifier 401 for the interaction zone which may be used by the application in locating the data associated with the interaction zone. Also included is a respective identifier 402 for each virtual feature associated with the interaction zone. The identifier 402 may be used to index a virtual feature data structure like the example data record 420 in FIG. 4B associated with a controlling application 166 which stores data for displaying the virtual feature. Additionally, a respective identifier 404 for each action associated with the virtual feature and with this interaction zone is also stored. Some examples of an action associated with the application are an action which may be performed by the virtual feature or an action performed with respect to the virtual feature, e.g. an appearance change.

The interaction zone data record 400 also stores space dimensions options 408. Some interaction zones have a fixed shape like a rectangle around an object. For other interaction zones, the shape of the zone may vary either in accordance with predetermined options like a bounding ellipse, a bounding sphere or a bounding rectangle. One of the options may also be conforming in which the shape of the interaction zone conforms to a real object or a virtual object to which it is registered. Similarly, there may be some interaction zones which have a fixed size. In many examples, the size dimensions of the interaction zone may vary, for example a conforming interaction zone may scale in size with a size of an associated virtual feature. As there may be multiple virtual features associated with an interaction zone which may be displayed at different times depending on which activity is performed within the zone, the shape of the zone may change to conform to different virtual features indicated to be displayed by the application. A size range 406 of the space dimensions of the interaction zone may be stored as well. Adjustable size and space shape data may be bases used by an application for determining where to place an interaction zone in a 3D mapping and to create an instance of the interaction zone with a size and shape which fits the placement in view of the size dimensions of the real environment.

The interaction zone data record 400 also includes activation criteria 410 options for the one or more virtual features associated with the zone as well as deactivation criteria 412 options for the one or more virtual features. A wearer of a near-eye, AR display in the environment may see a virtual object or other virtual feature when outside of the one or more boundaries of an interaction zone. In order for an action associated with the virtual feature to be performed, activation criteria is to be satisfied for the zone. In many examples, the activation criteria includes detection of entry into the space associated with the interaction zone of a near-eye AR display system like 8. Exit from the interaction zone of a near-eye AR display system like 8 often satisfies deactivation criteria. In some examples, activation criteria indicates a user body part or the user has moved at least a re-start distance from at least one boundary of an interaction zone after having satisfied deactivation criteria by exit from the one interaction zone. For some applications, a time interval between re-starts may be imposed.

Detection of user physical action of one or more body parts may also be activation criteria. Another example of deactivation criteria is completion of a time period or completion of an activity associated with the zone. For some interaction zones which are activated by touching or holding a virtual object of the zone, identifying removal of a user's hand from the virtual object may be deactivation criteria. The touching or holding and removal of the touch or hold may be identified based on image data by identifying a gesture of hand removal or by identifying one or more objects in display field of view which indicates the user has moved beyond touching or holding distance of the object based on the 3D mapping of the environment.

FIG. 4B is a block diagram illustrating an example of a virtual feature data record 420 which includes identifier 402 for the virtual feature as well as a location identifier 422 for the virtual data of the virtual feature. For example, for a virtual object, the virtual data may include an object physical properties data set $320_N$ for the virtual object. In some examples, the virtual data may be stored in a standardized holographic file format to provide for portability of data between platforms, compressing the data, use of smart objects, and facilitating virtual representation of real world objects. For more information about some embodiments of a holographic file format, see U.S. patent application Ser. No. 13/430,972, Geisner et al., entitled "Personal Audio/Visual System with Holographic Objects," filed Mar. 27, 2012, which is hereby incorporated herein by reference.

In this example, if the feature is an object, optionally a physics model 424 of the virtual object may also be stored. An embodiment of a physics model may include one or more storage location identifiers or the data for a structural model of the object, and one or more pre-collision events, collision effects, sound effects or visual effects for an interaction with another object. The physics model may also link to the action simulator library for representing actions of the virtual object which may be accessed using an action identifier 426. As illustrated, the virtual feature data record 420 may include one or more identifiers of one or more actions associated with the virtual feature. Some of these one or more action identifiers are identifiers 428 for one or more real environment dependent actions. The performance of such an action is dependent upon the presence of one or more real environment features or is altered based on their presence in the environment. For example, an action of a ghost virtual feature is to fly and a real environment dependent action is to fly from a dark area to a light area of an environment. An ambient effect like a lighting value in a range scale indicating degrees of lightness detected in image data by the scene mapping engine 306 may also be a real environment feature.

Another example of a real environment dependent action is for a virtual feature monster to crawl up a surface which satisfies a vertical criteria. Another real environment dependent action is for the virtual monster to hop across a surface which satisfies horizontal criteria. For an outdoor beach environment of an application operation space not including the dunes, the hopping action for the monster can be displayed while the crawling vertical action may not be used unless someone has built a tall sand castle. If the dunes region is included in the application operation space which is a playspace in this example, then both the crawling and hopping actions are available for display. In some embodiments, the real environment dependent actions may define criteria identifying the dependency on one or more real features as emergent behavior rules which are formatted for identifying a real world feature independently of a type of object. In the examples above, a geometric orientation 393 of a surface identifies a real world feature upon which the action depends. As illustrated in the ghost example, flying from a dark area to a light area does not tie the action to particular objects or areas like a lower corner of a room or under the couch for satisfying a dark area or a lamp or window during daytime for satisfying a light area.

The virtual feature data record 420 also comprises real environment compatibility criteria 430 for the virtual feature which identifies one or more real environment features to which the virtual feature may be registered. As described previously, a real environment feature may be a real object but may also be a real surface with certain properties, such as may have been identified by the object recognition engine 192 in a surface properties data set 388$_N$ in an object physical properties data set 320$_N$ for a real object. For example, a virtual feature may be an object like a basket which has real environment compatibility criteria of a horizontal surface of certain dimensions to support the basket bottom. A floor or a table or a chair seat or a stack of newspapers may have been identified in the environment by the scene mapping engine 306 which satisfies this criteria. Alternative compatibility criteria may be a hanging support structure of a size to support the handle of the basket and a mass to support the weight of the basket with content. A door knob may satisfy the hanging support structure criteria. In many examples, air space is a real environment feature in which an interaction zone may be placed, for example a virtual ghost may fly through air in a room, and the interaction zone shape conforms to the shape of the ghost.

As illustrated by the surface examples above, in some embodiments, the real environment compatibility criteria 430 is also defined using emergent behavior rules which are formatted for identifying a real world feature independently of a type of object. Emergent behavior rules enhance adaptability of executing an application in different real world environments.

In some embodiments, a type of object may be a basis of at least some real environment compatibility criteria 430 or used in the definition of one or more real environment dependent actions 428. A user or application can also associate an interaction zone with a type of object or a specific object, real or virtual. In some applications, a platform like a gaming platform may associate a type of interaction zone with a type of physical object which may be used by applications supported by the platform. For example, as a home is a typical place of gameplay, any real pillow, and any virtual pillow depending on the application design, identified in a location may have a default spherical interaction zone of a certain radius, e.g. 1 foot, which bounces any airborne object which comes within the spherical radius. In some examples, the pillow interaction zone may be used across various applications.

In other examples, a specific object may have an interaction zone associated with it by a user or an application. For example, a specific throw rug in a user's living room is identified as a clue giving interaction zone. The space of the zone may be the area of the rug or a volume extending from the rug perimeter upwards to a ceiling. The activation criteria may be for the personal AN to identify from image data, location data or both and a 3D mapping of the environment that its wearer is within the rug perimeter or rug volume and identify a codeword from a previous reward in voice data of the wearer. Upon satisfaction of the activation criteria, a virtual scroll with a picture or text describing a clue for completing a task or getting around an obstacle is displayed. User exit from the rug space causes the clue to disappear from the user's near-eye, AR display.

In some examples, an application may be updated to associate an interaction zone with a promotional item. For example, a user purchases a promotional T-shirt which when worn during execution of a game application allows the user to activate an interaction zone of a certain space size around him for a limited period of time. For example, the interaction zone may be a protective zone protecting the user from virtual obstacles in completing a task to increase a score or earn a reward. In the protective zone example, the T-shirt wearing user may get a number of activations of the interaction zone, each timed instance activated by a voice command or gesture, and the size of the interaction zone may vary with rewards the user has earned from play. In one example, the at least one virtual feature activated is display of a virtual object meeting an invisible wall of the interaction zone and being bounced back away from the user inside the zone.

Some applications may allow a user to place interaction zones in an environment or to change or modify characteristics of an interaction zone which the application provides. For example, a productivity enhancement application like an organization assistance application which helps a user put his keys in a same location may allow a user to identify a convenient place for finding his keys. For example, by voice data a user may initiate a user interaction zone template and indicate he is going to look at the boundaries for the interaction zone being created. Based on the gaze data, the size, shape and location of the interaction zone in a 3D mapped environment are identified for entry into a corresponding zone data record 400.

For an illustrative context, a user may designate a foyer at the entrance of his home as an interaction zone, and identifies as activation criteria an action of his entry from the outside into the entrance foyer. He performs this action as training, and image data captured during the training performance is captured for later use in detecting the activation criteria. Additionally, the precision of GPS technology keeps improving, and some commercially available GPS technology has a precision of less than a few feet, (e.g. 3-4). The location data from such a GPS sensor included in the location sensing unit 144 can also be used to identify satisfaction of the activation criteria.

The user may use a menu to select one or more virtual features like virtual monsters and the like to be used in the interaction zone and actions associated therewith from examples provided by the application. In this example, the user selects audio data of his own voice and a virtual arrow as virtual features for the zone and the one or more actions triggered by the activation criteria is playing audio data of him saying "Don't forget to put your keys down right here, or else you will put them down somewhere else and lose them" while displaying the arrow pointing to a key hook on the foyer wall.

In another example, the productivity application may allow a user to designate an interaction zone of a distance around his specific office desk and activation criteria of coming within the distance of the desk for a first time during a day. In one example, the virtual feature displayed responsive to the activation criteria is his calendar and identification of any telephone callers since he left the desk.

FIG. 4C is a block diagram illustrating an example of adaptive augmented reality environment criteria. As with virtual features generally, the adaptive AR environment criteria 342 configures interaction zones in the AR environment based on satisfying quality of experience criteria 436 for an application. As discussed above, maintaining a degree of difficulty of a game application may be an objective. For example, for a shooting game in which a user shoots flying targets, the application user quality of experience criteria 436 may provide parameter ranges for speed and size of targets and distance between targets based on a size of the application operation space identified by the scene mapping engine 306 in mapping the environment.

In the case of interaction zones, the application places interaction zones in accordance with zone compatibility criteria 431, some examples of which are illustrated as compatibility criteria based on type of zone 432 and compatibility criteria based on size of zone 434. One example of zone compatibility criteria is a spatial distance criteria between at least two interaction zones relative to size dimensions of the augmented reality environment. Another example of zone compatibility criteria effecting placement within the 3D AR environment is avoiding satisfaction of activation criteria for one zone also inadvertently satisfying another zone's activation criteria at the same time. For example, two gaze activated interaction zones are positioned to avoid sharing a gaze activation line of sight. In another solution, the application may nest the zones in a same space if the application's objectives as embodied in the application quality of experience criteria 436 if the zones can be available at different times in the environment. At least one of the interaction zones may have more than one activation criteria option for one or more virtual objects, for example a gesture rather than gaze. The application can assign one of the zones to use the gesture criteria as activation criteria and disable gaze activation while the other zone is assigned to use gaze activation and disabling the gesture activation.

Another example of compatibility criteria is a spatial distance between at least two types of interaction zones based on an amount of space available for user movement. For example, a room with a certain amount of clutter may cause two types of zones to be closer together. A type of zone may be assigned to a zone based on a characteristic like those of the data fields in the interaction zone record 400. An application may also identify a type of zone based on its associated activity in the application. For example, a game application may identify a source zone providing a virtual object to be carried by a player and a destination zone for receiving the virtual object by a virtual character in order to score points. The amount of clutter on a floor in a room environment where the game is being played effects the application's placement of the source and destination zones including a spatial distance between them.

As mentioned above, comfort criteria 438 for user physical characteristics may also be a basis for determining where to place an interaction zone in an augmented reality environment.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system embodiments described above. However, the method embodiments are not limited to operating in the system embodiments described above and may be implemented in other system embodiments. Furthermore, the method embodiments are continuously performed while the display device is in operation and an applicable application is executing.

Figure 5:
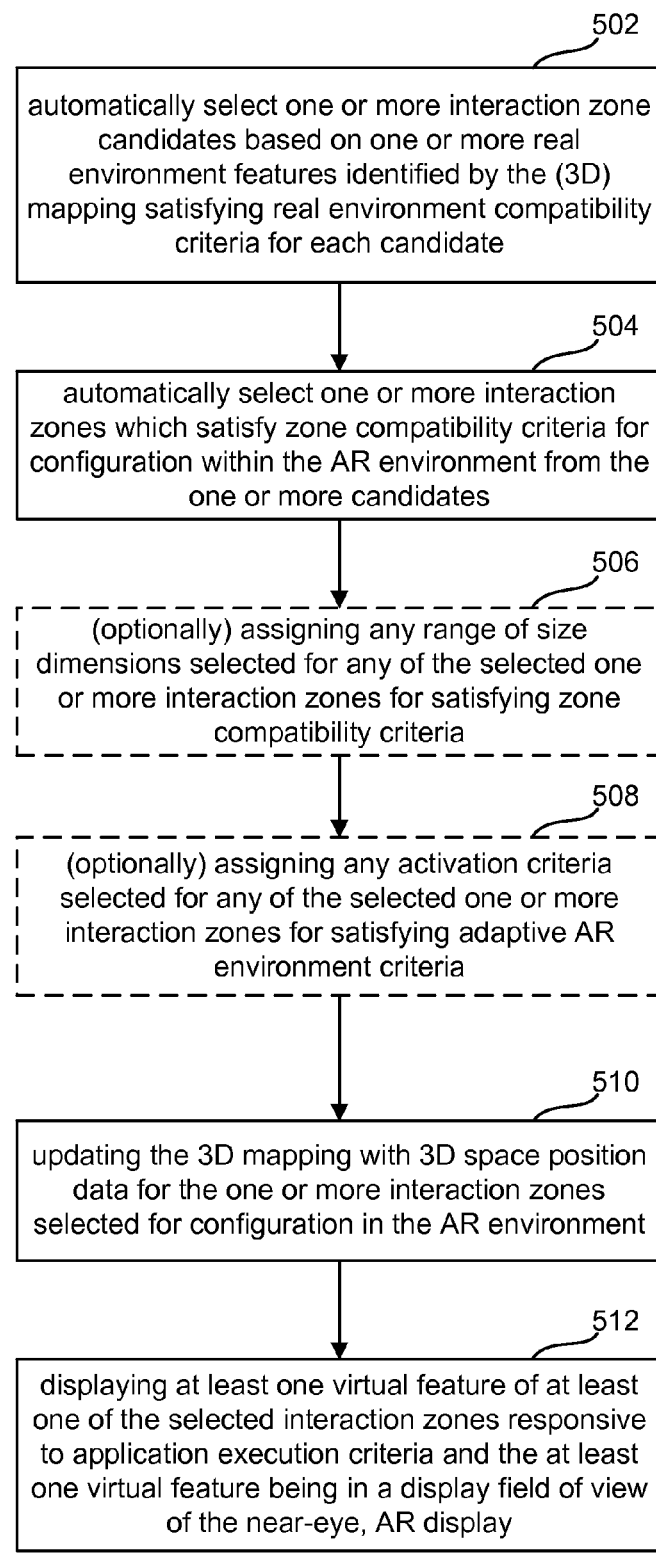
FIG. 5 is a flowchart of an embodiment of a method for adaptively configuring one or more interaction zones within an augmented reality environment.

FIG. 5 is a flowchart of an embodiment of a method for adaptively configuring one or more interaction zones within an augmented reality environment. In step 502, an application automatically selects one or more interaction zone candidates based on one or more real environment features identified by the (3D) mapping satisfying real environment compatibility criteria for each candidate. In step 504, one or more interaction zones which satisfy zone compatibility criteria for configuration within the AR environment from the one or more candidates are automatically selected. For example, the application may identify a range of space dimensions for each interaction zone candidate and determine whether one or more space dimensions within the range satisfy the spatial distance criteria with at least one other interaction zone candidate relative to size dimensions of the augmented reality environment. In the selection process, a selected zone may have been selected subject to use of a selected range of size dimensions for the interaction zone. In such circumstances, an optional step 506 may be performed of assigning any range of size dimensions which may have been selected for any of the selected one or more interaction zones for satisfying zone compatibility criteria. Additionally, as in the example above of determining placement of two gaze activated interaction zones, one solution may be to use an alternative activation criteria option available for at least one of the zones. An optional step 508 comprises assigning any activation criteria selected for any of the selected one or more interaction zones for satisfying the application's adaptive AR environment criteria. The criteria may be quality of experience in nature such as avoiding using the same activation criteria for all zones if possible. The criteria may also be spatial distance related or size dimension related. There may not be enough space for having entry or a gesture be included in activation criteria for two neighboring zones, but if one uses gaze, both zones will fit in the space. In step 510, the 3D mapping is updated with 3D space position data for the one or more interaction zones selected for configuration in the AR environment. For example, the application 166 may send an update notification to the scene mapping engine.

In step 512, at least one virtual feature of at least one of the selected interaction zones is displayed responsive to application execution criteria and the at least one virtual feature being in a display field of view of the near-eye, AR display. Application execution criteria comprises its operation logic. For example, if the application nested a number of interaction zones to share a same physical space, the operation logic may indicate one of these interaction zones are displayed at a time as the activities for them are completed sequentially. In another example, the application execution criteria may indicate at least one virtual feature of an interaction zone may be displayed if viewed by a near-eye display device positioned outside the interaction zone, for example so a user can identify where the zone is in order to move toward it.

Figure 6:
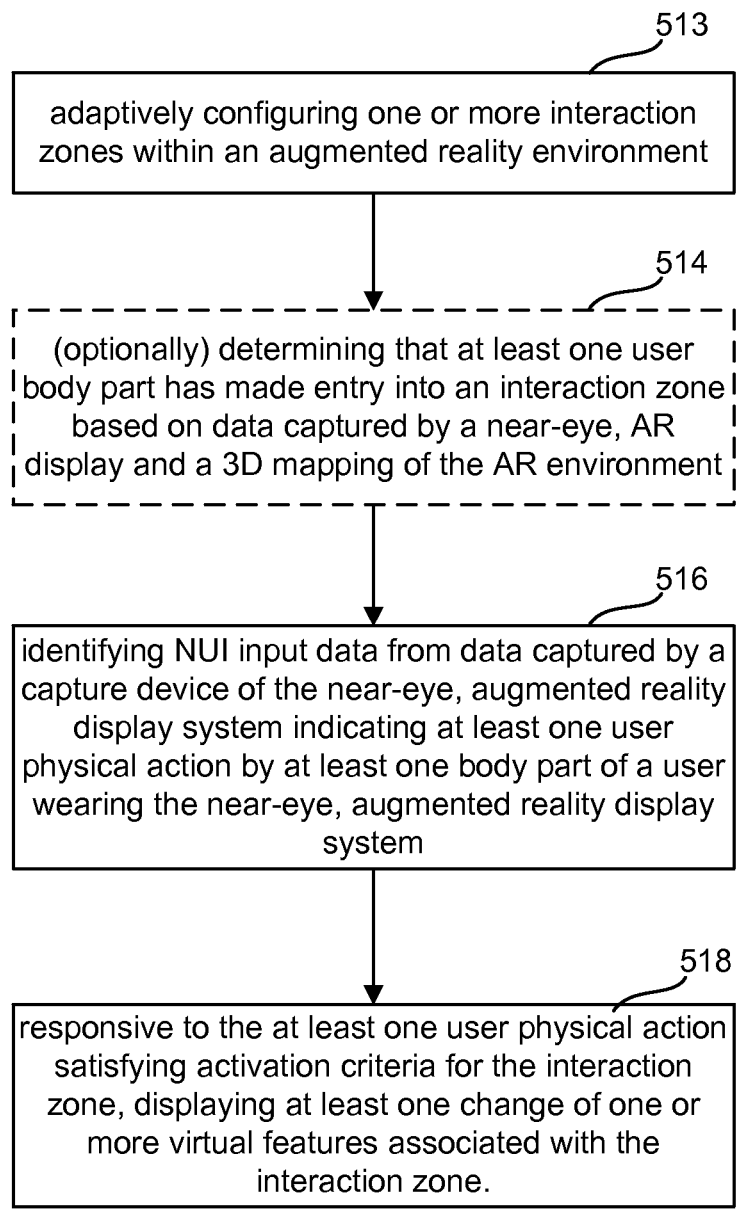
FIG. 6 is a flowchart of an embodiment of a method for controlling activation an interaction zone within an augmented reality environment by a near-eye, augmented reality display system.

FIG. 6 is a flowchart of an embodiment of a method for controlling activation of an interaction zone within an augmented reality environment by a near-eye, augmented reality display system. In step 513, the application adaptively configures one or more interaction zones within an augmented reality (AR) environment, for example by using the method embodiment of FIG. 5. Optional step 514 may be performed for an interaction zone having activation criteria which includes entry into the zone. In optional step 514 it is determined that at least one user body part has made entry into an interaction zone based on data captured by a capture device of the near-eye, AR display and a 3D mapping of the AR environment. For example, a user hand or finger within an interaction zone including a movable virtual object may be identified from image data captured by the front facing capture devices 113 and either depth data derived from the image data or depth data also captured by the capture devices 113 and a 3D mapping of the augmented reality environment. In another example, the application may determine the near-eye AR display, and hence the user head to which it is mounted, has made entry into an interaction zone based on tracking a position of the near-eye AR display in the 3D mapping of the AR environment. As discussed above, objects in data captured by the front facing capture devices 113 may be matched with current 3D space positions of the objects in the 3D mapping. Orientation data from the inertial sensing unit 132 and location data from a GPS transceiver or other location sensor may be used as well in the determination.

In step 516, NUI input data is identified from data captured by a capture device of the near-eye, augmented reality display system indicating at least one user physical action by at least one body part of a user wearing the near-eye, augmented reality display system. In step 518, responsive to the at least one user physical action satisfying activation criteria for the interaction zone, the near-eye, AR display displays at least one change of one or more virtual features associated with the interaction zone. For example, the change of one or more virtual features associated with the interaction zone may be display of at least one virtual feature performing at least one action responsive to the at least one user physical action. An example of this would be an animation of a virtual cuckoo clock opening its little door from which a cuckoo bird appears and says or sings a clue or the like in accordance with a game application. In other examples, the change may involve replacement of one virtual feature with another or removal of one virtual feature from the display and displaying another. In other examples, the displayed change may be a change in the appearance of the virtual feature. An example of this would be a color change or highlighting or a face appearing within a door knocker. Many examples may comprise combinations of one or more changes like these illustrative examples. The figures below illustrate some examples of a user physical action of at least one body part satisfying activation criteria.

FIGS. 7A, 7B, 7C and 7D illustrate configuration and activation of interaction zones in an augmented reality environment in a contextual example of players using their near-eye, AR display systems to play a trivia game in a real living room being augmented with interaction zones including virtual features.

Figure 7A:
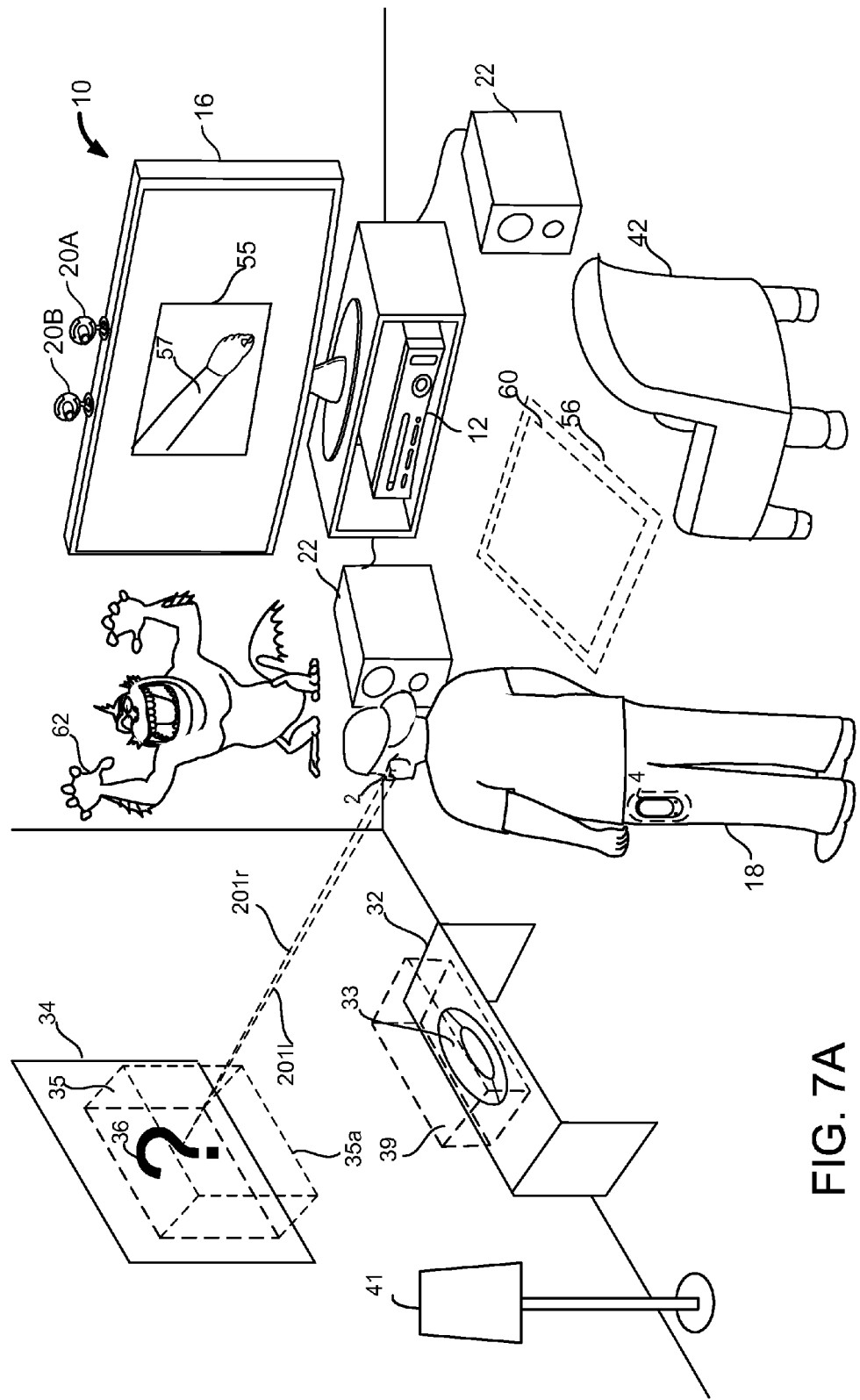
FIG. 7A illustrates an example of a configuration of interaction zones augmenting a real environment for display by a near-eye, augmented reality display system.

FIG. 7A illustrates an example of a configuration of interaction zones augmenting a real environment for display by a near-eye, augmented reality display system. In this example, player Joe 18 is wearing a near-eye display device system 8 including a near-eye, AR display device 2 with a mobile smartphone as a companion processing module 4 and has decided to play a trivia game. There are illustrated four interaction zones. A question and answer (Q&A) zone 35 for which Joe's display device is displaying a virtual question mark 36 as Joe is currently looking at it, two nested "helping hand" interaction zones 60 and 56 which provide clues and other aids in answering questions posed by zone 35, and a "basket" zone 39 for collecting apples as points. A certain number of points wins a game and achieves a level of skill. The objective of the game application is to answer trivia questions correctly and get one or more apples for each correct answer. Virtual monster 62 tries to grab the apple as it is shot out from the zone 35 for a correct answer. The player tries to get the apple in the bowl 33 serving as a basket in basket zone 39.

The scene mapping engine 306 identifies the size of the living room from a previously stored 3D mapping or one it has generated of the living room. The 3D image and depth capture devices 20A and 20B coupled to game console acting as a network accessible computer system 12 may have been the source of the previously stored 3D mapping. Based on the size of the living room and the amount of free space for walking and running, the game application decides to nest the two type of helping hand zones 60 and 56. Zone 56 provides clues, and zone 60 provides aids for fighting the monster.

The 3D mapping identifies objects in the living room including a home entertainment system 10 including speakers 22, the game console, the capture devices 20A and 20B and the TV 16. The TV 16 is selected for the helping hand zone as a player reaches to take items from a virtual helping hand 57, and there is free space in front of the TV for a user to stand in and reach the TV screen with a hand. Entry into an area illustrated by the dashed squares 60 and 56 are part of the activation criteria for these zones, and they are placed a distance from the TV at a comfortable reach distance for Joe. The real environment criteria for the helping hand defines a volume size corresponding to a size of the virtual helping hand 57 selected for a particular instance of an interaction zone. The mirror 34 is high by the comfort criteria for reaching for Joe's height and the table 32 obstacle in the path. However, the mirror 34 is at a comfortable gaze height for Joe, and the Q&A zone is activated by gaze. The helping hand and Q&A zones have flexible real environment criteria, and could have been placed on a wall or pop-up out of the floor or even been displayed in air space. The chair 42 could have been used for the helping hand 56 as well and been gaze activated too. Avoiding redundant configurations may also be a factor in the adaptive AR environment criteria. Each interaction zone is registered to a real surface in this example. The Q&A zone 35 is attached to a mirror 34 which is at a comfortable gazing height for player Joe 18.

For the basket zone, the application's adaptive AR environment criteria 342 has a preference for using a real object as the basket if available over a generating a virtual one as users connect more with the game the more it uses real objects. A real bowl 33 is identified on a table 32, and an interaction zone 39 is placed around the bowl 33. Responsive to a gesture of a player placing a virtual apple in the bowl, his score is increased.

In this example, the application may identify to Joe what are the interaction zones by giving him instructions on where to look. If Joe looks at the TV, he sees in looking through his display device 2 a virtual overlay 55 with a virtual helping hand 57 object which may be a 3D virtual object. If he looks at the ground, the squares may be highlighted in his display device 2. If he looks at the mirror 34, he sees the 3D virtual question mark 36. The bowl 33 is also identified at the basket. The helping hand zones, and the basket zone are not activated yet, and Joe's gaze duration has not met a gaze duration threshold yet to activate the Q&A zone 35.

Figure 7B:
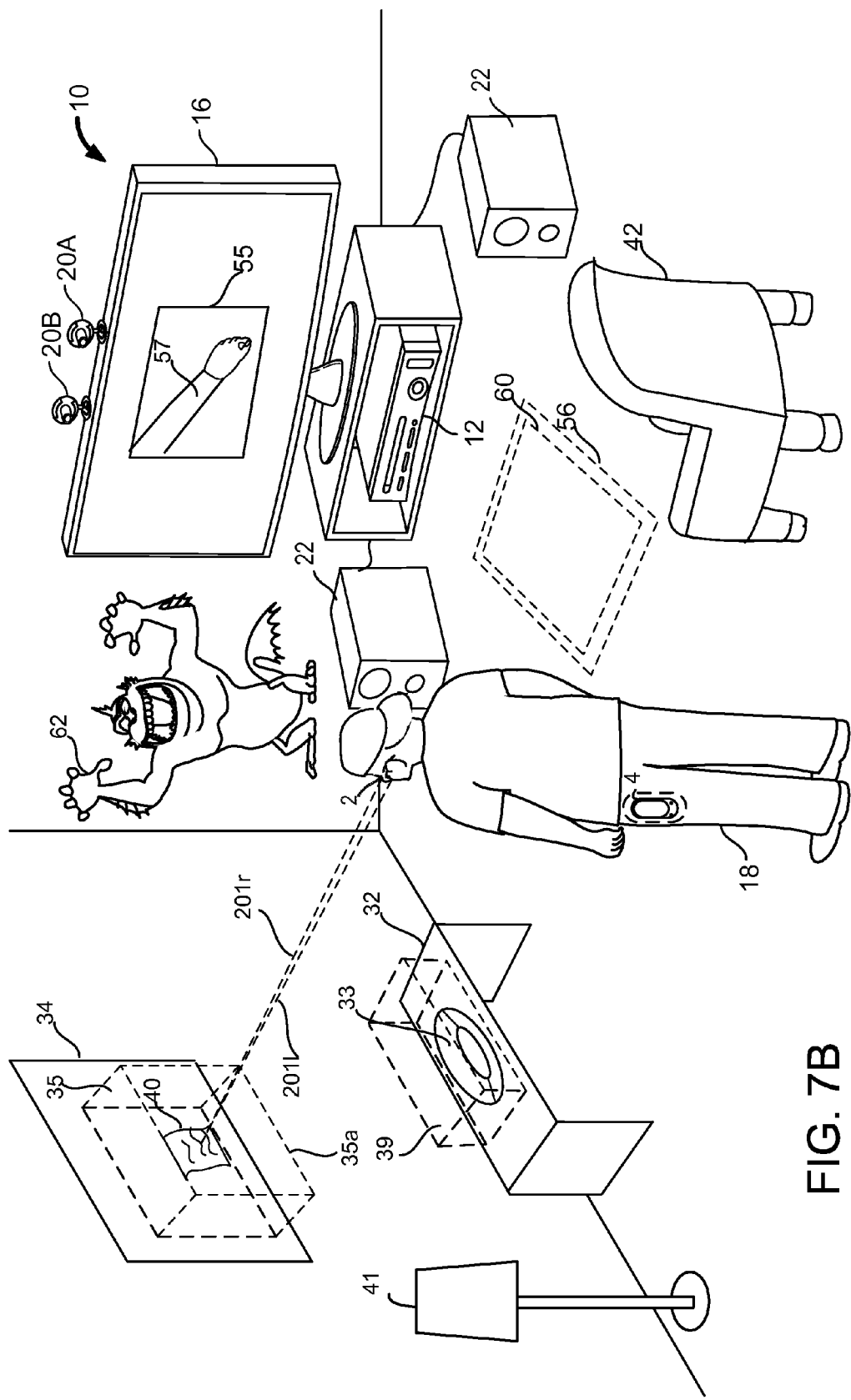
FIG. 7B illustrates an example of activation of at least one virtual feature of an interaction zone responsive to user entry into the zone.

FIG. 7B illustrates an example of activation of at least one virtual feature of an interaction zone based on natural user interface (NUI) input data. In this example, activation criteria for zone 35 includes a gaze duration of the virtual question mark 36 at a point within zone 35 from a gaze angle which indicates the gaze lines intersect the front of the interaction zone 35A. Joe's gaze as represented by gaze lines 201*l* and 201*r* has satisfied the gaze duration and angle activation criteria for zone 35 in order for a question to be displayed. In other examples, Joe may have to say a word or sing a tune or song in addition to satisfying the gaze duration and angle criteria. Responsive to Joe's gaze action, at least one change of one or more virtual features associated with the interaction is displayed. In this example, the virtual question mark 36 has been replaced with a virtual scroll 40 presenting a question. Other eye based actions may have been activation criteria as well, some examples of which are a blink sequence or a gaze pattern or an angle of gaze of the virtual question mark 36. Joe does not know the answer, so he seeks a clue.

Figure 7C:
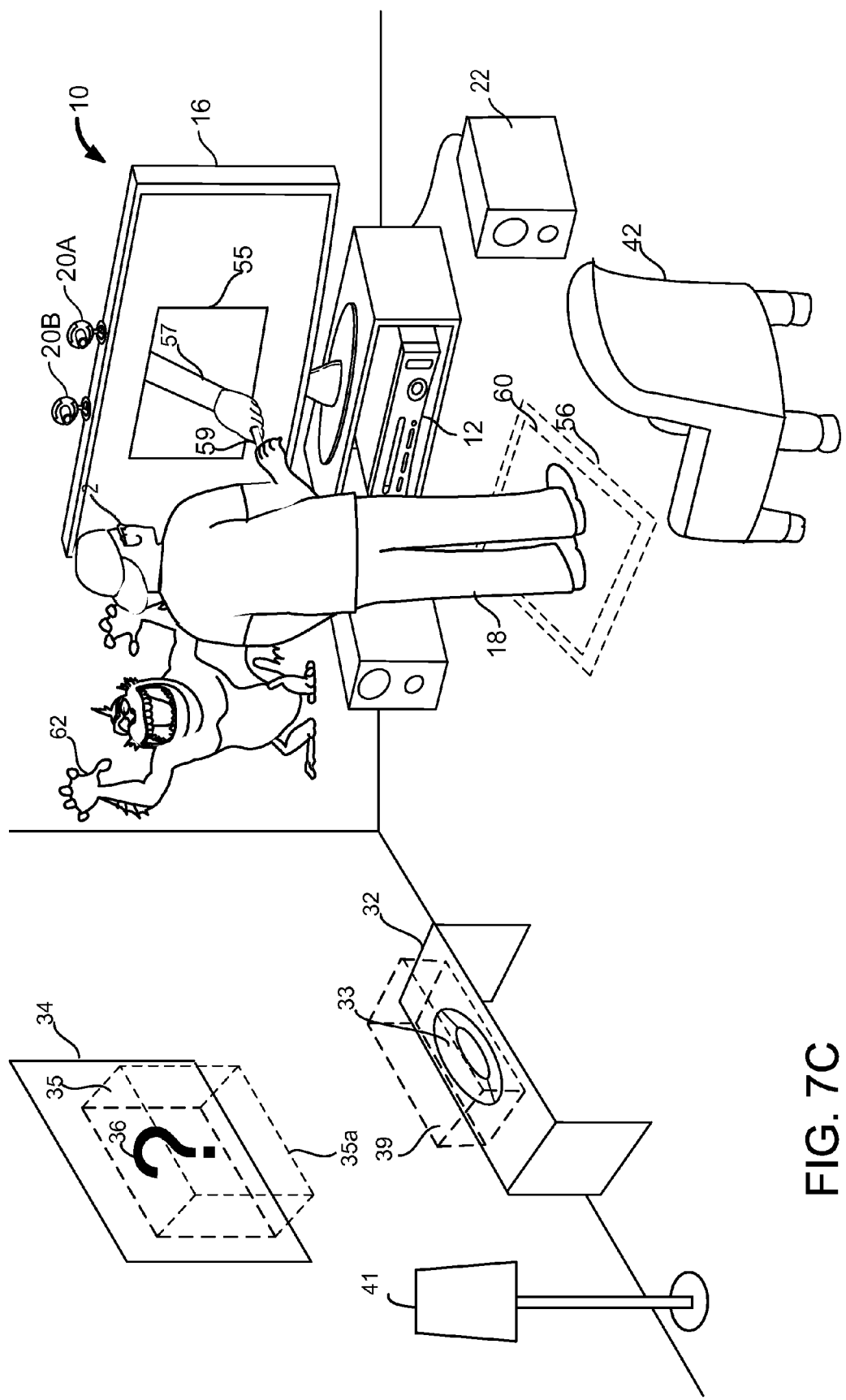
FIG. 7C illustrates an example of activation of at least one virtual feature of an interaction zone based on natural user interface (NUI) input data.

FIG. 7C illustrates an example of activation of at least one virtual feature of an interaction zone responsive to user entry into the zone. In FIG. 7C, Joe has stepped within the shared space area for zone 60 and 56. However, the activation criteria for zone 60 has not been met in that a task of at least three apples have not been placed in the bowl. Activation criteria of entering the area of space for zone 56 has been satisfied. The display of the 3D virtual helping hand changes in that the helping hand performs an action of extending a clue scroll responsive to Joe's satisfactory entry into the area of space for zone 56. The 3D virtual helping hand 57 extends from the TV 16 and hands Joe a clue described in a virtual scroll 59 for the question.

If Joe looked through his near-eye AR display device 2 at the Q&A zone 35, he would see the virtual question mark 36 again in his display as the stopping of his gaze within the box 35 has satisfied deactivation criteria.

Figure 7D:
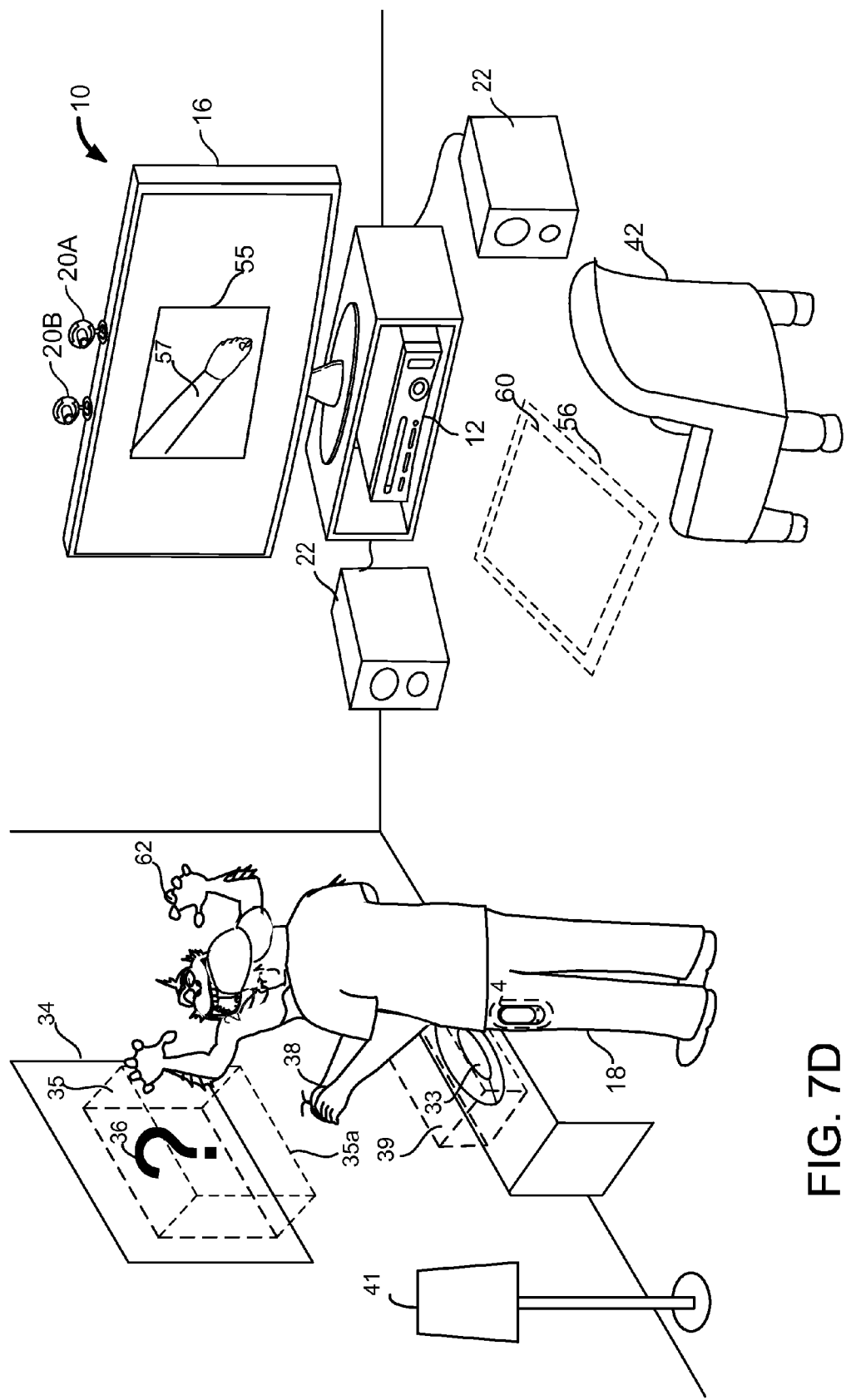
FIG. 7D continues the example of FIGS. 7A, 7B and 7C.

FIG. 7D continues the example of FIGS. 7A, 7B and 7C. Joe has answered the question correctly, and a virtual apple was shot out of the box shaped interaction zone 35 which Joe caught despite the monster's 62 attempts to grab the apple 38, and Joe attempts to place the virtual apple in the bowl 33. As indicated above, responsive to Joe's successful user physical action of his hand placing the virtual apple in the real bowl 33, the application increases his score and may display a visual aid like highlighting the rim of the bowl 33. In one example after a predetermined number of apples have been placed in the bowl 33, a message scroll may be displayed in the bowl which Joe can retrieve and read to see that he has qualified for a reward or aid in fighting the monster.

Figure 7E:
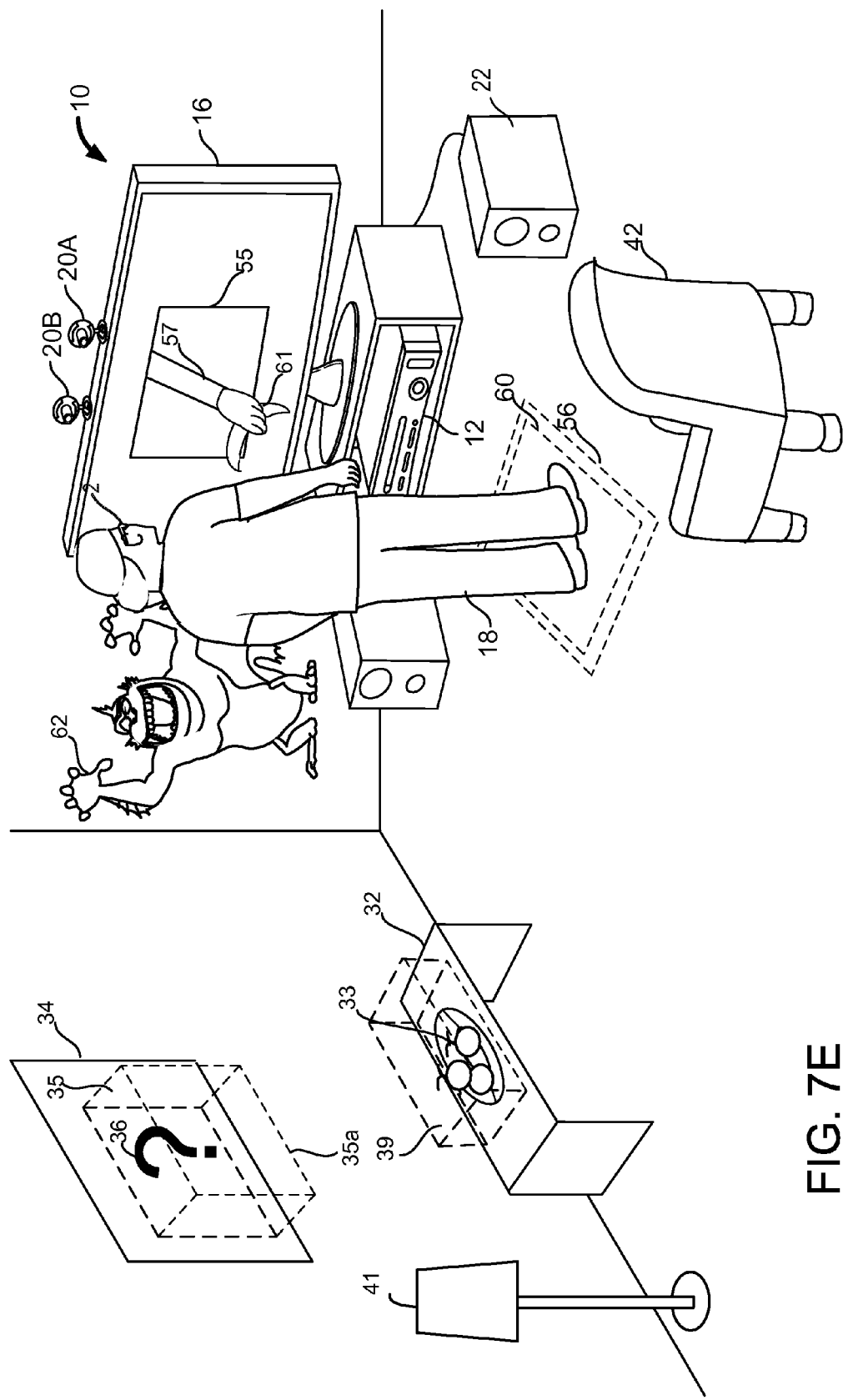
FIG. 7E illustrates an example of satisfying activation criteria for a nested interaction zone.

FIG. 7E illustrates an example of satisfying activation criteria for a nested interaction zone. In this example, Joe has completed a task of answering at least three questions correctly, and getting their corresponding apples 38 in the bowl 33. He has decided to return to the TV for an aid against the monster before proceeding to the next question as the monster gets quicker as the game progresses. In this example, the 3D virtual helping hand 57 gives Joe a banana 61 as bananas distract the monster from an apple.

Figure 8:
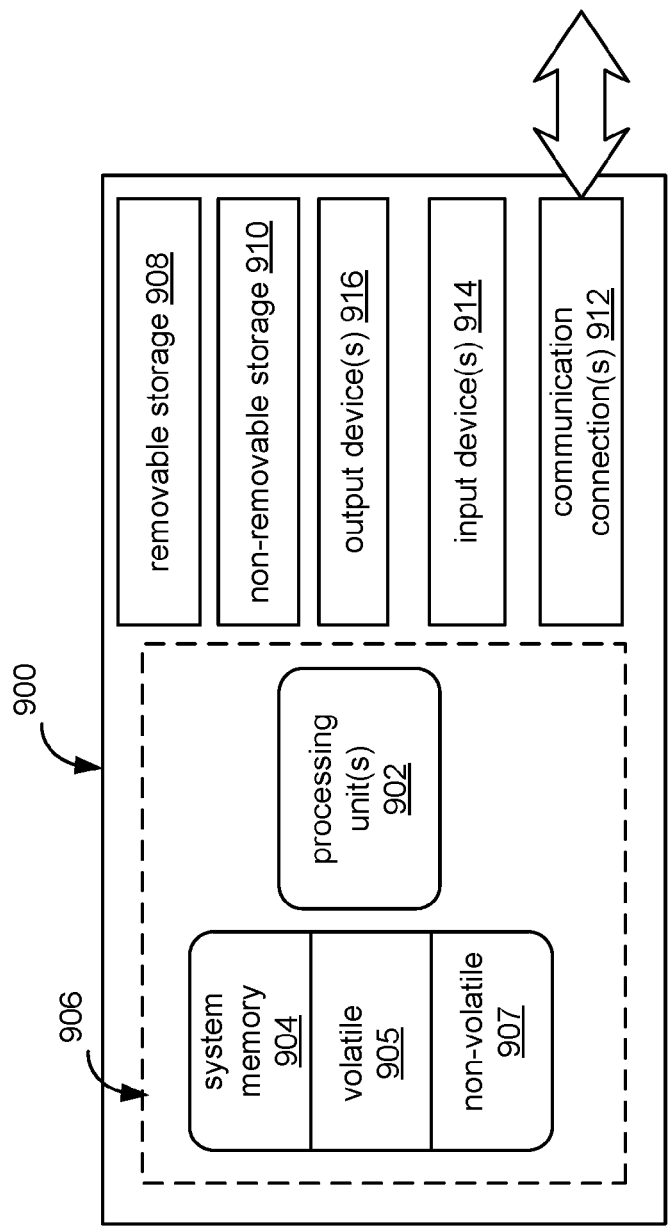
FIG. 8 is a block diagram of one embodiment of a computing system that can be used to implement a network accessible computer system or a companion processing module.

FIG. 8 is a block diagram of one embodiment of a computing system that can be used to implement one or more network accessible computer systems 12 or a companion processing module 4 which may host at least some of the software components of computing environment 54 or other elements depicted in FIG. 3A. With reference to FIG. 8, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 8 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. These devices are well known in the art so they are not discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for adaptively configuring one or more interaction zones within an augmented reality environment including a real environment and at least one virtual feature, the method comprising:
    an interaction zone including at least one virtual feature, real environment compatibility criteria for the at least one virtual feature, space dimensions and activation criteria for the at least one virtual feature;
    automatically selecting one or more interaction zone candidates based on one or more real environment features of the real environment satisfying real environment compatibility criteria for candidates being identified in a (3D) mapping of the augmented reality environment;
    automatically selecting one or more interaction zones which satisfy zone compatibility criteria for configuration within the augmented reality environment from the one or more candidates;
    updating the 3D mapping with 3D space position data for the one or more interaction zones selected for configuration in the augmented reality environment;
    displaying at least one virtual feature of at least one of the selected interaction zones by a near-eye, augmented reality display responsive to application execution criteria being satisfied, and the at least one virtual feature being dynamically animated and responsive to the real environment compatibility criteria, the space dimensions and the activation criteria when the at least one virtual feature is within a display field of view of the near-eye, augmented reality display; and
    identifying a range of the space dimensions for the one or more interaction zone candidates and determining whether one or more of the space dimensions within the range satisfy spatial distance criteria with at least one other of the interaction zone candidates relative to size dimensions of the augmented reality environment, and
    responsive to satisfying the spatial distance criteria, providing another activation criteria for the at least one other of the interaction zone candidates to avoid satisfying the activation criteria of the one or more interaction zone candidates.

2. The method of claim 1 wherein the real environment compatibility criteria for at least one virtual feature of the one or more interaction zone candidates comprises a surface with one or more physical properties.

3. The method of claim 1 wherein the real environment compatibility criteria further comprises lighting.

4. The method of claim 1 wherein the zone compatibility criteria includes the spatial distance criteria between at least two types of interaction zones relative to the size dimensions of the augmented reality environment.

5. The method of claim 1 further comprising:
assigning activation criteria selected for any of the selected one or more interaction zones for satisfying adaptive augmented reality environment criteria.

6. A system for adaptively configuring one or more interaction zones within an augmented reality environment including a real environment and at least one virtual feature comprising:
a near-eye, augmented reality display having a display field of view and being supported by a near-eye support structure;
one or more processors communicatively coupled to the near-eye, augmented reality display for controlling the display;
the one or more processors having access to memory storing a three-dimensional (3D) mapping of the augmented reality environment including 3D space positions for objects in the augmented reality environment;
the memory storing interaction zone data for an interaction zone including an identifier of a virtual feature, a storage location identifier of virtual data for display of the virtual feature, space dimensions for the interaction zone, real environment compatibility criteria, activation criteria for the interaction zone, and one or more actions for performance by the virtual feature including one or more real environment dependent actions; and
the one or more processors automatically configuring one or more interaction zones at 3D space positions in the 3D mapping of the augmented reality environment based on one or more real environment features satisfying the real environment compatibility criteria, such that the at least one virtual feature is configured to be animated and responsive to the real environment dependent actions based on the real environment compatibility criteria, the space dimensions and the activation criteria when the at least one virtual feature is within a display field of view of the near-eye, augmented reality display, wherein
the real environment compatibility criteria comprise one or more emergent behavior rules which identify a real environment feature based on real environment dependent actions and independently of a type of object.

7. The system of claim 6 further comprising:
the one or more processors being communicatively coupled to at least one camera supported by the support structure for receiving image data and depth data including the display field of view captured by the at least one camera;
the one or more processors automatically determining one or more real environment features including size dimensions of the augmented reality environment based on the captured image and depth data; and
the one or more processors automatically configuring one or more interaction zones at 3D space positions in the 3D mapping of the augmented reality environment based on one or more real environment features satisfying the real environment compatibility criteria further comprises the one or more processors automatically determining a number of the one or more interaction zones based on the size dimensions of the augmented reality environment.

8. The system of claim 6 wherein the one or more real environment dependent actions are controlled by one or more emergent behavior rules which identify a real environment feature independently of a type of object.

9. The system of claim 6 wherein the real environment feature comprises at least one of the following comprising:
one or more surface properties; and
a lighting value.

10. The system of claim 6 wherein the one or more processors automatically configuring one or more interaction zones at 3D space positions in the 3D mapping of the augmented reality environment based on one or more real environment features satisfying the real environment compatibility criteria further comprises:
identifying the one or more real environment features which satisfy the real environment compatibility and comfort criteria for at least one physical characteristic of a user wearing the near-eye, augmented reality display; and
registering the one or more interaction zones to the identified one or more real environment features.

11. The system of claim 6 further comprising:
the one or more processors modifying a performance parameter for one or more actions for performance by at least one virtual feature of the one or more interaction zones based on the 3D space positions in the 3D mapping and quality of experience criteria.

12. The system of claim 6 further comprising:
a natural user interface comprising an eye tracking system being positioned by the support structure and eye tracking software being executed by the one or more processors for identifying a user physical action of an eye based action based on eye data from the eye tracking system; and
the one or more processors activating the virtual feature of at least one interaction zone of the one or more interaction zones responsive to the eye based action satisfying activation criteria of the at least one interaction zone.

13. The system of claim 6 wherein at least one interaction zone of the one or more interaction zones is registered to a movable object within the augmented reality environment.

14. One or more processor readable storage devices comprising instructions which cause one or more processors to execute a method for controlling activation of one or more interaction zones within an augmented reality environment including a real environment and at least one virtual feature by a near-eye, augmented reality display device system, the method comprising:
an interaction zone including at least one virtual feature, space dimensions and one or more boundaries, activation criteria for the interaction zone, and deactivation criteria for the interaction zone;
adaptively configuring one or more interaction zones within an augmented reality environment and automatically changing a shape of the one or more interaction zones to conform with different features of the at least one virtual feature;
identifying natural user input data from data captured by a capture device of the near-eye, augmented reality display system indicating at least one user physical action by at least one body part of a user wearing the near-eye, augmented reality display device system; and
responsive to the at least one user physical action satisfying the activation criteria for the at least one interaction zone, displaying at least one change of one or more virtual features associated with the at least one interaction zone, and the at least one virtual feature is configured to be animated and responsive to the user physical action based on the real environment compatibility criteria, the space dimensions and the activation criteria.

15. The one or more processor readable storage devices of claim 14 wherein the activation criteria for the at least one interaction zone further comprises successful completion of at least one task associated with at least one other interaction zone.

16. The one or more processor readable storage devices of claim 15 wherein the activation criteria for the at least one interaction zone further comprises the near-eye augmented reality display system detecting a near-eye, augmented reality display device of the near-eye, augmented reality display device system has moved at least a re-start distance from at least one boundary of the at least one interaction zone after having satisfied deactivation criteria by exiting from the at least one interaction zone.

17. The one or more processor readable storage devices of claim 14 wherein adaptively configuring one or more interaction zones within the augmented reality environment further comprises nesting at least two interaction zones of the one or more interaction zones in which the at least two interaction zones at least partially share a 3D space position in the augmented reality environment, and successful completion of at least one task in at least one of the at least two interaction zones permits display of another of the at least two interaction zones.

18. The one or more processor readable storage devices of claim 14 wherein the at least one user physical action satisfying the activation criteria for the at least one interaction zone is a gesture.

* * * * *